(12) United States Patent
Lowe et al.

(10) Patent No.: US 11,669,708 B2
(45) Date of Patent: Jun. 6, 2023

(54) METAL, CERAMIC, OR CERAMIC-COATED TRANSACTION CARD WITH WINDOW OR WINDOW PATTERN AND OPTIONAL BACKLIGHTING

(71) Applicant: CompoSecure, LLC, Somerset, NJ (US)

(72) Inventors: Adam Lowe, Somerset, NJ (US); John Esau, Marlboro, NJ (US)

(73) Assignee: CompoSecure, LLC, Somerset, NJ (US)

( * ) Notice: Subject to any disclaimer, the term of this patent is extended or adjusted under 35 U.S.C. 154(b) by 0 days.

(21) Appl. No.: 17/211,972

(22) Filed: Mar. 25, 2021

(65) Prior Publication Data

US 2021/0209437 A1 Jul. 8, 2021

Related U.S. Application Data

(63) Continuation of application No. 16/751,285, filed on Jan. 24, 2020, now Pat. No. 11,151,437, which is a continuation-in-part of application No. PCT/US2018/052832, filed on Sep. 26, 2018, and a continuation-in-part of application No. 16/124,711, filed on Sep. 7, 2018, now Pat. No. 10,885,419.

(60) Provisional application No. 62/686,358, filed on Jun. 18, 2018, provisional application No. 62/610,745, filed on Dec. 27, 2017, provisional application No.
(Continued)

(51) Int. Cl.
*G06K 19/077* (2006.01)
*G06K 19/06* (2006.01)

(52) U.S. Cl.
CPC . *G06K 19/07701* (2013.01); *G06K 19/06196* (2013.01); *G06K 19/07722* (2013.01); *G06K 19/07747* (2013.01)

(58) Field of Classification Search
CPC ....... G06K 19/07701; G06K 19/06196; G06K 19/07722; G06K 19/07747
See application file for complete search history.

(56) References Cited

U.S. PATENT DOCUMENTS

| | | |
|---|---|---|
| 3,802,101 A | 4/1974 | Scantlin |
| 4,737,620 A | 4/1988 | Mollet et al. |
| 5,013,900 A | 5/1991 | Hoppe |

(Continued)

FOREIGN PATENT DOCUMENTS

| | | |
|---|---|---|
| CA | 2347818 | 5/2000 |
| CA | 2860909 A1 | 8/2013 |

(Continued)

OTHER PUBLICATIONS

International Search Report and Written Opinion for International Application No. PCT/US2021/013796, dated May 11, 2021, 22 pages.

(Continued)

*Primary Examiner* — Laura A Gudorf
(74) *Attorney, Agent, or Firm* — RatnerPrestia

(57) ABSTRACT

A transaction card includes at least one metal layer having one or more apertures therein. A light guide is disposed beneath the metal layer. The light guide has a light output and a light input. The light output is positioned to transmit light through at least the one or more apertures of the metal layer. At least one LED is positioned to transmit light into the light input of the light guide.

17 Claims, 12 Drawing Sheets

Related U.S. Application Data

62/573,789, filed on Oct. 18, 2017, provisional application No. 62/555,367, filed on Sep. 7, 2017.

(56) References Cited

U.S. PATENT DOCUMENTS

| | | |
|---|---|---|
| 5,048,179 A | 9/1991 | Shindo et al. |
| 5,350,553 A | 9/1994 | Gläser et al. |
| 5,412,199 A | 5/1995 | Finkelstein et al. |
| 5,434,405 A | 7/1995 | Finkelstein et al. |
| 5,463,953 A | 11/1995 | Kaspers et al. |
| 5,574,309 A | 11/1996 | Papapietro et al. |
| 5,598,032 A | 1/1997 | Fidalgo |
| 5,608,203 A | 3/1997 | Finkelstein et al. |
| 5,681,356 A | 10/1997 | Barak et al. |
| 5,774,339 A | 6/1998 | Ohbuchi et al. |
| 5,935,497 A | 8/1999 | Rose |
| 5,962,840 A | 10/1999 | Haghiri-Tehrani et al. |
| 6,065,681 A | 5/2000 | Trueggelmann |
| 6,188,580 B1 | 2/2001 | Huber et al. |
| 6,190,942 B1 | 2/2001 | Wilm et al. |
| 6,724,103 B2 | 4/2004 | Parrault |
| 6,817,532 B2 | 11/2004 | Finkelstein |
| 6,902,116 B2 | 7/2005 | Finkelstein |
| D529,955 S | 10/2006 | Allard et al. |
| 7,237,724 B2 | 7/2007 | Singleton |
| 7,701,350 B2 | 4/2010 | Sakama |
| 7,762,470 B2 | 7/2010 | Finn et al. |
| 7,823,777 B2 | 11/2010 | Varga et al. |
| 7,936,273 B2 | 5/2011 | Kobayashi et al. |
| 7,954,228 B2 | 6/2011 | Kobayashi et al. |
| 7,997,503 B2 | 8/2011 | Walker |
| 8,128,000 B2 | 3/2012 | Forster |
| 8,141,786 B2 | 3/2012 | Bhandarkar et al. |
| 8,174,454 B2 | 5/2012 | Mayer |
| 8,226,013 B2 | 7/2012 | Phillips et al. |
| 8,248,240 B2 | 8/2012 | Osaki et al. |
| 8,261,997 B2 | 9/2012 | Gebhart |
| 8,448,872 B2 | 5/2013 | Droz |
| 8,519,905 B2 | 8/2013 | Tanaka et al. |
| 8,608,082 B2 | 12/2013 | Le Garrec et al. |
| 8,622,311 B2 | 1/2014 | Hamedani et al. |
| 8,698,633 B2 | 4/2014 | Kobayashi et al. |
| 8,725,589 B1 | 5/2014 | Skelding et al. |
| 8,786,510 B2 | 7/2014 | Coleman et al. |
| 8,789,762 B2 | 7/2014 | Finn et al. |
| 8,978,987 B2 | 3/2015 | Scarlatella |
| 9,000,619 B2 | 4/2015 | Kato et al. |
| 9,058,547 B2 | 6/2015 | Oh et al. |
| 9,099,789 B1 | 8/2015 | Modra |
| 9,251,458 B2 | 2/2016 | Finn et al. |
| 9,320,186 B2 | 4/2016 | Droz |
| 9,390,363 B1 | 7/2016 | Herslow et al. |
| 9,390,364 B2 | 7/2016 | Finn et al. |
| 9,390,368 B2 | 7/2016 | Herslow et al. |
| 9,475,086 B2 | 10/2016 | Finn et al. |
| 9,489,613 B2 | 11/2016 | Finn et al. |
| 9,576,238 B2 | 2/2017 | Yosui |
| 9,622,359 B2 | 4/2017 | Finn et al. |
| 9,634,391 B2 | 4/2017 | Finn et al. |
| 9,665,818 B1 | 5/2017 | Cardinal et al. |
| 9,697,459 B2 | 7/2017 | Finn et al. |
| 9,721,200 B2 | 8/2017 | Herslow et al. |
| D797,188 S | 9/2017 | Hendrick |
| 9,760,818 B2 | 9/2017 | Williams et al. |
| 9,798,968 B2 | 10/2017 | Finn et al. |
| 9,812,782 B2 | 11/2017 | Finn et al. |
| 9,836,684 B2 | 12/2017 | Finn et al. |
| 9,898,699 B2 | 2/2018 | Herslow et al. |
| D812,137 S | 3/2018 | Daniel |
| 10,032,099 B2 | 7/2018 | Mosteller |
| 10,089,570 B2 | 10/2018 | Herslow et al. |
| 10,140,569 B2 | 11/2018 | Kang et al. |
| 10,147,999 B2 | 12/2018 | Wang et al. |
| 10,193,211 B2 | 1/2019 | Finn et al. |
| 10,339,434 B2 | 7/2019 | Cox |
| 10,406,734 B2 | 9/2019 | Lowe |
| 10,445,627 B1 | 10/2019 | Sexi et al. |
| 10,583,683 B1 | 3/2020 | Ridenour et al. |
| 10,762,412 B2 | 9/2020 | Lowe et al. |
| 10,783,422 B2 | 9/2020 | Herslow et al. |
| 10,885,419 B2 | 1/2021 | Lowe et al. |
| 2002/0190132 A1 | 12/2002 | Kayanakis |
| 2003/0028174 A1 | 2/2003 | Chan et al. |
| 2003/0102541 A1 | 6/2003 | Gore et al. |
| 2005/0087609 A1 | 4/2005 | Martin |
| 2006/0088802 A1 | 4/2006 | Toikowsky |
| 2006/0102729 A1 | 5/2006 | Gandel et al. |
| 2006/0219776 A1 | 10/2006 | Finn |
| 2006/0226240 A1 | 10/2006 | Singleton |
| 2007/0034700 A1 | 2/2007 | Poidomani et al. |
| 2007/0075132 A1 | 4/2007 | Kean |
| 2007/0075312 A1 | 4/2007 | Chin et al. |
| 2007/0290048 A1 | 12/2007 | Singleton |
| 2008/0001759 A1 | 1/2008 | Kobayashi et al. |
| 2009/0031954 A1 | 2/2009 | Williams et al. |
| 2011/0024036 A1 | 2/2011 | Benato |
| 2011/0315779 A1 | 12/2011 | Bidin et al. |
| 2012/0044693 A1 | 2/2012 | Hatase et al. |
| 2012/0201994 A1 | 8/2012 | Michalk |
| 2012/0206869 A1 | 8/2012 | Droz |
| 2013/0062875 A1 | 3/2013 | Le Loarer et al. |
| 2013/0102113 A1 | 4/2013 | Yang |
| 2013/0228628 A1 | 9/2013 | Bona et al. |
| 2013/0247432 A1 | 9/2013 | Droz |
| 2013/0255078 A1 | 10/2013 | Cox |
| 2013/0255079 A1 | 10/2013 | Maijala et al. |
| 2013/0299593 A1 | 11/2013 | Glidden, III |
| 2014/0158773 A1 | 6/2014 | Blum |
| 2014/0224881 A1 | 8/2014 | Herslow |
| 2014/0279555 A1 | 9/2014 | Guillaud |
| 2014/0283978 A1 | 9/2014 | Droz |
| 2014/0361086 A1 | 12/2014 | Finn et al. |
| 2015/0021403 A1 | 1/2015 | Finn et al. |
| 2015/0097040 A1 | 4/2015 | Rampetzreiter et al. |
| 2015/0129665 A1 | 5/2015 | Finn et al. |
| 2015/0136858 A1 | 5/2015 | Finn et al. |
| 2015/0180229 A1 | 6/2015 | Herslow |
| 2015/0206047 A1 | 7/2015 | Herslow et al. |
| 2015/0235063 A1 | 8/2015 | Loussert |
| 2015/0235122 A1 | 8/2015 | Finn et al. |
| 2015/0239202 A1 | 8/2015 | Purdy et al. |
| 2015/0269471 A1 | 9/2015 | Finn et al. |
| 2015/0269474 A1 | 9/2015 | Finn et al. |
| 2015/0269477 A1 | 9/2015 | Finn et al. |
| 2015/0278675 A1 | 10/2015 | Finn et al. |
| 2015/0339564 A1 | 11/2015 | Herslow et al. |
| 2016/0110639 A1 | 4/2016 | Finn et al. |
| 2016/0180212 A1 | 6/2016 | Herslow et al. |
| 2016/0203399 A1 | 7/2016 | Cox |
| 2016/0229081 A1 | 8/2016 | Williams et al. |
| 2016/0365644 A1 | 12/2016 | Finn et al. |
| 2017/0017871 A1 | 1/2017 | Finn et al. |
| 2017/0077589 A1 | 3/2017 | Finn et al. |
| 2017/0106572 A1 | 4/2017 | Cepress et al. |
| 2017/0243099 A1 | 8/2017 | Kluge |
| 2017/0243104 A1 | 8/2017 | Cox |
| 2017/0262749 A1 | 9/2017 | Cox |
| 2017/0270398 A1 | 9/2017 | Mathieu et al. |
| 2017/0308785 A1 | 10/2017 | Kim et al. |
| 2017/0316300 A1 | 11/2017 | Herslow et al. |
| 2017/0316303 A1 | 11/2017 | Pachler et al. |
| 2017/0323193 A1* | 11/2017 | Kitney ............... G06K 19/0709 |
| 2018/0068212 A1 | 3/2018 | Williams et al. |
| 2018/0123221 A1 | 5/2018 | Finn et al. |
| 2018/0157954 A1 | 6/2018 | Herslow et al. |
| 2018/0204105 A1 | 7/2018 | Herslow et al. |
| 2018/0307962 A1 | 10/2018 | Lowe et al. |
| 2018/0339503 A1 | 11/2018 | Finn et al. |
| 2018/0341846 A1 | 11/2018 | Finn et al. |
| 2018/0341847 A1 | 11/2018 | Finn et al. |
| 2018/0349751 A1 | 12/2018 | Herslow et al. |
| 2019/0050706 A1 | 2/2019 | Lowe |
| 2019/0114526 A1 | 4/2019 | Finn et al. |
| 2019/0130242 A1 | 5/2019 | Fu et al. |

(56) References Cited

U.S. PATENT DOCUMENTS

| | | | |
|---|---|---|---|
| 2019/0156073 | A1 | 5/2019 | Finn et al. |
| 2019/0156994 | A1 | 5/2019 | Cox |
| 2019/0197381 | A1 | 6/2019 | Cox |
| 2019/0204812 | A1 | 7/2019 | Cox |
| 2019/0206161 | A1 | 7/2019 | Cox |
| 2019/0236434 | A1 | 8/2019 | Lowe |
| 2019/0279065 | A1 | 9/2019 | Cox |
| 2019/0300695 | A1 | 10/2019 | Cox |

FOREIGN PATENT DOCUMENTS

| | | | |
|---|---|---|---|
| CN | 100397406 | C | 6/2008 |
| CN | 101281618 | A | 10/2008 |
| CN | 101375647 | A | 2/2009 |
| CN | 103153640 | A | 6/2013 |
| CN | 106599977 | A | 12/2016 |
| DE | 19703122 | C1 | 5/1998 |
| DE | 19848193 | C1 | 11/1999 |
| DE | 19934434 | A1 | 2/2001 |
| DE | 10132893 | A1 | 1/2003 |
| DE | 102007016777 | A1 | 10/2008 |
| DE | 102008053582 | B3 | 4/2010 |
| EP | 0277854 | A1 | 8/1988 |
| EP | 0426406 | A2 | 5/1991 |
| EP | 1884889 | A2 | 2/2008 |
| EP | 2133828 | A2 | 12/2009 |
| EP | 2722193 | A1 | 4/2014 |
| EP | 2765648 | A1 | 8/2014 |
| EP | 3009964 | A1 | 4/2016 |
| JP | 61222715 | A | 10/1986 |
| JP | 63072596 | A | 4/1988 |
| JP | 6399995 | A | 5/1988 |
| JP | 63185688 | A | 8/1988 |
| JP | 63239097 | A | 10/1988 |
| JP | 021397 | A | 1/1990 |
| JP | 02055198 | A | 2/1990 |
| JP | 03205197 | A | 9/1991 |
| JP | 0412240 | B | 3/1992 |
| JP | 0564861 | A | 3/1993 |
| JP | 07501758 | A | 2/1995 |
| JP | 08123926 | A | 5/1996 |
| JP | 08276459 | A | 10/1996 |
| JP | 09311921 | A | 12/1997 |
| JP | 09315053 | A | 12/1997 |
| JP | 10291392 | A | 11/1998 |
| JP | 1111056 | A | 1/1999 |
| JP | 2001505682 | A | 4/2001 |
| JP | 2003234615 | A | 8/2003 |
| JP | 2004094561 | A | 3/2004 |
| JP | 2004509537 | A | 3/2004 |
| JP | 2004252802 | A | 9/2004 |
| JP | 2007021830 | A | 2/2007 |
| JP | 2008052721 | A | 3/2008 |
| JP | 2008538430 | A | 10/2008 |
| JP | 2013162195 | A | 8/2013 |
| JP | 2016071683 | A | 5/2016 |
| KR | 20010080890 | A | 8/2001 |
| KR | 20140117614 | A | 10/2014 |
| KR | 20170061572 | A | 6/2017 |
| KR | 20170120524 | A | 10/2017 |
| TW | 504647 | | 10/2002 |
| TW | 201723933 | A | 7/2017 |
| WO | 9809252 | A1 | 3/1998 |
| WO | 0223674 | A2 | 3/2002 |
| WO | 2006107968 | A1 | 10/2006 |
| WO | 2008105582 | A1 | 9/2008 |
| WO | 2013110625 | A1 | 8/2013 |
| WO | 2013115148 | A1 | 8/2013 |
| WO | 2013131153 | A1 | 9/2013 |
| WO | 2014149926 | A1 | 9/2014 |
| WO | 2015071017 | A1 | 5/2015 |
| WO | 2015071086 | A1 | 5/2015 |
| WO | 2015144261 | A1 | 10/2015 |
| WO | 2016020067 | A1 | 2/2016 |
| WO | 2016046184 | A1 | 3/2016 |
| WO | 2016073473 | A1 | 5/2016 |
| WO | 2017007468 | A1 | 1/2017 |
| WO | 2017090891 | A1 | 6/2017 |
| WO | 2017177906 | A1 | 10/2017 |
| WO | 2018022755 | A1 | 2/2018 |
| WO | 2018132404 | A1 | 7/2018 |
| WO | 2018138432 | A1 | 8/2018 |
| WO | 2018202774 | A | 11/2018 |
| WO | 2019079007 | A1 | 4/2019 |

OTHER PUBLICATIONS

Notice of Termination of Pretrial Reexamination for Japanese Application No. 2019-504037, dated May 18, 2021 with translation, 2 pages.
Report of Pretrial Reexamination of Japanese Application No. 2019-504037, dated May 12, 2021 with translation, 5 pages.
Japanese Notice of Reasons for Rejection for Japanese Application No. 2020-522026, dated May 25, 2021 with translation, 8 pages.
International Preliminary Report on Patentability for International Application No. PCT/US2019/056704, dated Apr. 14, 2021, 7 pages.
Non Final Office Action for U.S. Appl. No. 17/101,096, dated Oct. 15, 2021, 59 pages.
Taiwan Office Action for Taiwan Application No. 109117975, dated Sep. 24, 2021 with translation, 22 pages.
Final Office Action for U.S. Appl. No. 17/128,427, dated Oct. 5, 2021, 16 pages.
Singapore Written Opinion for Application No. 11202003431Y, dated Apr. 22, 2021, 7 pages.
Non Final Office Action for U.S. Appl. No. 17/101,092, dated Sep. 16, 2021, 54 pages.
Non Final Office Action for U.S. Appl. No. 17/128,427, dated Dec. 15, 2021, 20 pages.
Taiwan Office Action for Taiwan Application No. 110102065, dated Dec. 1, 2021 with Search Report. 12 pages.
Chinese Office Action for Chinese Application No. 201780046491. 5, dated Jul. 5, 2021 with translation, 16 pages.
Indian Examination Report for Indian Application No. 202017013311, dated Jul. 8, 2021 with translation, 6 pages.
Australian Examination Report for Australian Application No. 2019213838, dated Jun. 29, 2021, 8 pages.
Japanese Notice of Reasons for Rejection for Japanese Application No. 2020-541522, dated May 31, 2021 with translation, 7 pages.
Non Final Office Action for U.S. Appl. No. 17/128,427, dated Jun. 29, 2021, 53 pages.
Chen et al., "A Metallic RFID Tag Design for Steel-Bar and Wire-Rod Management Application in the Steel Industry", Progress in Electromagnetics Research, PIER 91, 2009, pp. 195-212.
European Communication Pursuant to Article 94(3) for European Application No. 17835207.6, dated Oct. 23, 2020, 6 pages.
Extended European Search Report for European Application No. 17835207.6, dated Mar. 10, 2020, 12 pages.
Final Office Action for U.S. Appl. No. 16/124,711, dated Aug. 7, 2020, 18 pages.
Final Office Action for U.S. Appl. No. 16/164,322, dated Apr. 11, 2019, 20 pages.
International Preliminary Report on Patentability for International Application No. PCT/US2017/043954, dated Jan. 29, 2019, 6 pages.
International Preliminary Report on Patentability for International Application No. PCT/US2018/049899, dated Mar. 10, 2020, 8 pages.
International Preliminary Report on Patentability for International Application No. PCT/US2018/052832, dated Apr. 21, 2020, 9 pages.
International Search Report and Written Opinion for international Application No. PCT/US2017/043954, dated Oct. 5, 2017, 6 pages.
International Search Report and Written Opinion for International Application No. PCT/US2019/014656, dated Apr. 1, 2019, 16 pages.
International Search Report and Written Opinion for International Application No. PCT/US2019/056704, dated Dec. 18, 2019, 11 pages.

(56) References Cited

OTHER PUBLICATIONS

International Search Report and Written Opinion for International Application No. PCT/US2020/034661, dated Sep. 1, 2020, 16 pages.
Japanese Decision of Final Rejection for Japanese Application No. 2019-504037, dated Oct. 6, 2020, with translation, 5 pages.
Japanese Notice of Reasons for Rejection for Japanese Application No. 2019-504037, dated Mar. 10, 2020 with translation, 7 pages.
Korean Office Action for Korean Application No. 10-2019-7005614, dated Apr. 17, 2020, with translation, 14 pages.
Non Final Office Action for U.S. Appl. No. 15/928,813, dated Apr. 15, 2020, 51 pages.
Non Final Office Action for U.S. Appl. No. 16/124,711, dated May 1, 2020, 31 pages.
Non Final Office Action for U.S. Appl. No. 16/320,597, dated Apr. 13, 2021, 74 pages.
Non Final Office Action for U.S. Appl. No. 16/427,864, dated Nov. 4, 2020, 56 pages.
Non Final Office Action for U.S. Appl. No. 16/441,363, dated Aug. 8, 2019, 23 pages.
Non Final Office Action for U.S. Appl. No. 16/751,285, dated Jan. 25, 2021, 51 pages.
Non Final Office Action for U.S. Appl. No. 16/783,524, dated Oct. 15, 2020, 38 pages.
Non Final Office Action for U.S. Appl. No. 29/663,230, dated Jul. 25, 2019, 19 pages.
Notice of Allowance for U.S. Appl. No. 14/783,504, dated Nov. 13, 2020, 12 pages.
Third Party Submission Under 37 CFR 1.290, filed in U.S. Appl. No. 15/928,813, Concise Description of Relevance, dated Oct. 15, 2019, 13 pages.
Third Party Submission Under 37 CFR 1.290, filed in U.S. Appl. No. 15/928,813, Concise Description of Relevance, dated Nov. 1, 2019, 8 pages.
Third Party Submission Under 37 CFR 1.290, filed in U.S. Appl. No. 15/928,813, Concise Description of Relevance, dated Oct. 27, 2019, 13 pages.
U.S. Appl. No. 62/545,630, filed Sep. 14, 2017, 27 pages.
U.S. Appl. No. 62/555,367, filed Sep. 29. 2017, 26 pages.
U.S. Appl. No. 62/573,789, filed Oct. 27, 2017, 24 pages.
U.S. Appl. No. 62/610,745, filed Jan. 17, 2018, 39 pages.
U.S. Appl. No. 62/686,358, filed Jun. 20, 2018, 48 pages.
Entire patent prosecutton history of U.S. Appl. No. 15/928,813, filed Mar. 22, 2018, entitled, "Di Capacitive Embedded Metal Card."
Entire patent prosecution history of U.S. Appl. No. 16/983,395, filed Aug. 3, 2020, entitled, Di Capacitive Embedded Metal Card.
Entire patent prosecution history of U.S. Appl. No. 16/320,597, filed Jan. 25, 2019, entitled, "Overmolded Electronic Components for Transaction Cards and Methods of Making Thereof."
Entire patent prosecution history of U.S. Appl. No. 16/124,711, filed Sep. 7, 2018, entitled, Transaction Card With Embedded Electronic Components and Process for Manufacture.
Entire patent prosecution history of U.S. Appl. No. 17/101,092, filed Nov. 23, 2020, entitled, "Transaction Card With Embedded Electronic Components and Process for Manufacture."
Entire patent prosecution history of U.S. Appl. No. 17/101,096, filed Nov. 23, 2020, entitled, "Transaction Card With Embedded Electronic Components and Process for Manufacture."
Entire patent prosecutton history of U.S. Appl. No. 16/751,285, filed Jan. 24, 2020, entitled, "Metal, Ceramic, or Ceramic-Coated Transaction Card With Window or Window Pattern and Optional Backlighting."
Indian Examination Report for Indian Application No. 202017030442, dated Jun. 2, 2022 with translation, 7 pages.
Non Final Office Action for U.S. Appl. No. 17/101,092, dated Feb. 17, 2022, 26 pages.
Indian Examination Report for Indian Application No. 202017017173, dated Mar. 11, 2022 with translation, 7 pages.
Japanese Notice of Reasons for Refusal for Japanese Applicationn No. 2021-521110, dated Apr. 26, 2022 with translation, 11 pages.
Singapore Written Opinion for Application No. 11202002064S, dated Jul. 6, 2022, 5 pages.
Japanese Notice of Reasons for Rejection for Japanese Application No. 2020-613769, dated Jul. 5, 2022 with translation, 15 pages.
Japanese Notice of Reasons for Rejection for Japanese Application No. 2021-003355, dated Oct. 11, 2022 with translation, 7 pages.
Chinese Office Action for Chinese Application No. 201880080975.6, dated Dec. 22, 2022 with translation, 19 pages.
Chinese Office Action for Chinese Application No. 201880065325.4, dated Mar. 8, 2023 with translation, 35 pages.

\* cited by examiner

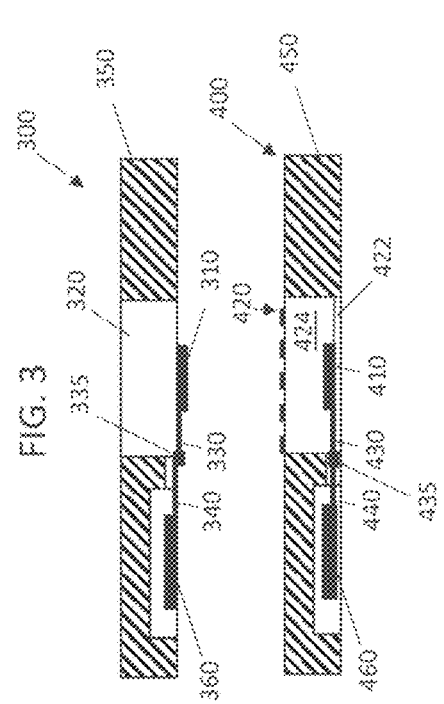
FIG. 3
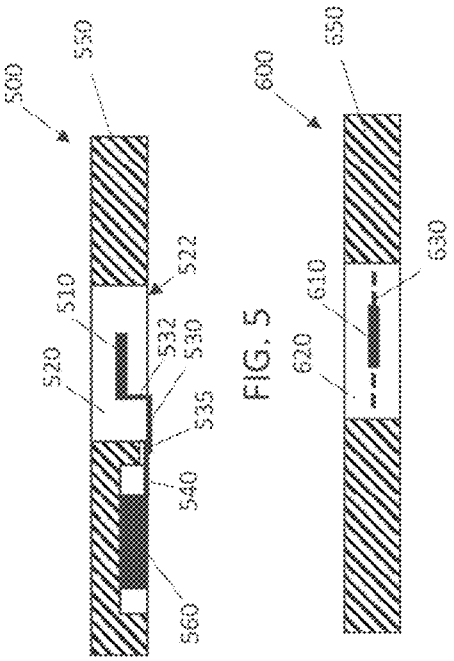
FIG. 4
FIG. 5
FIG. 6
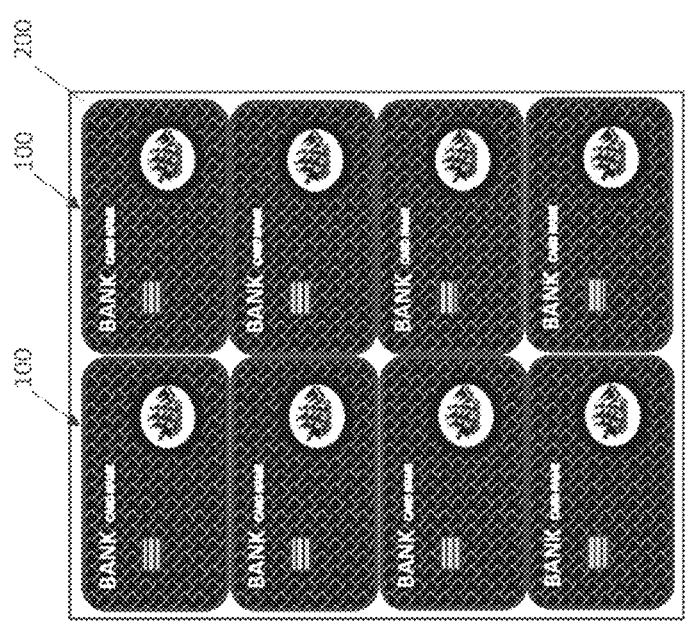
FIG. 2

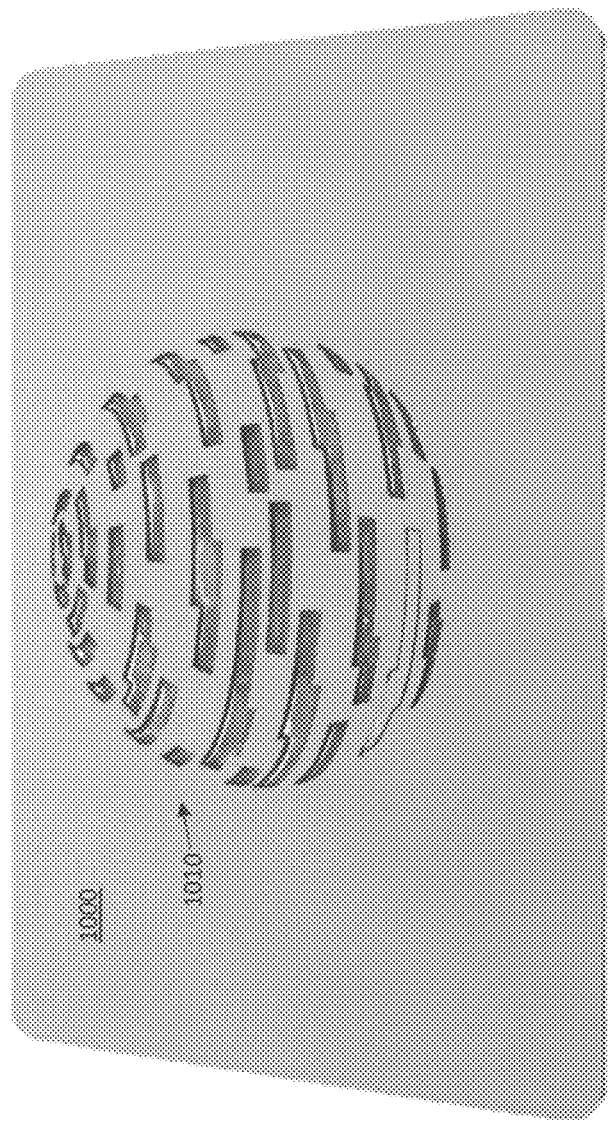

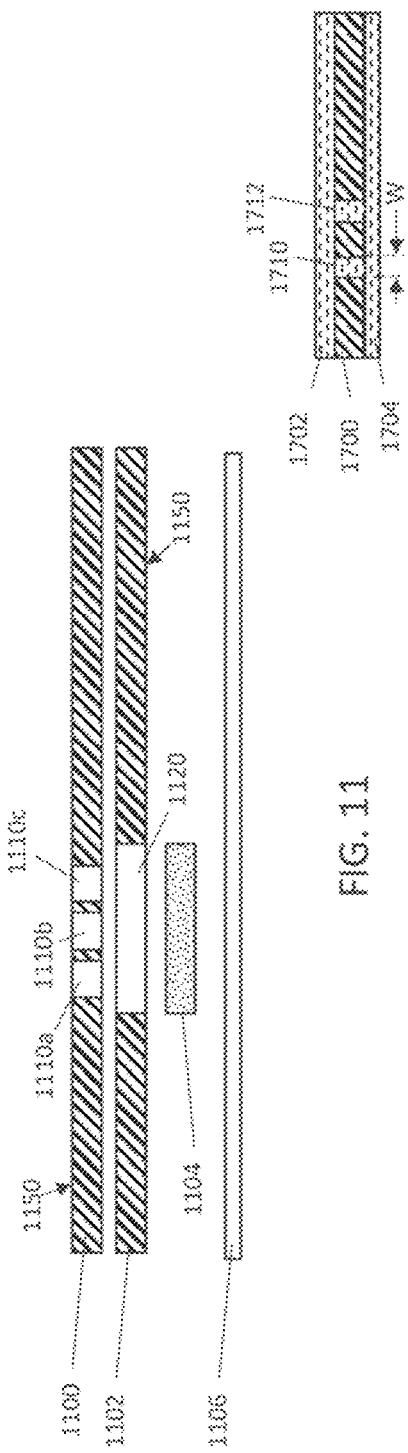
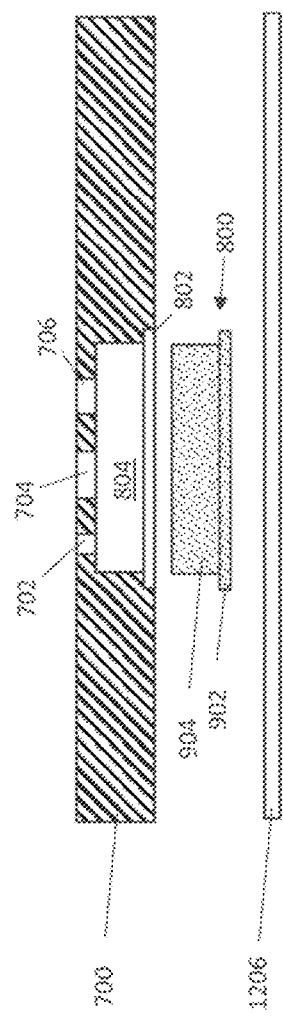
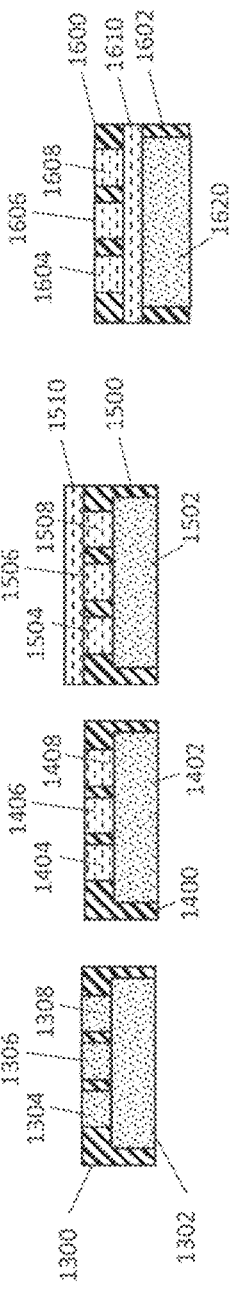
FIG. 11
FIG. 12
FIG. 13
FIG. 14
FIG. 15
FIG. 16
FIG. 17

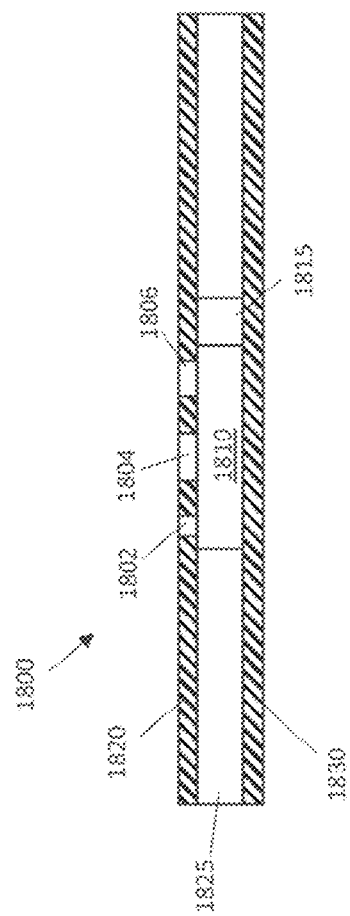

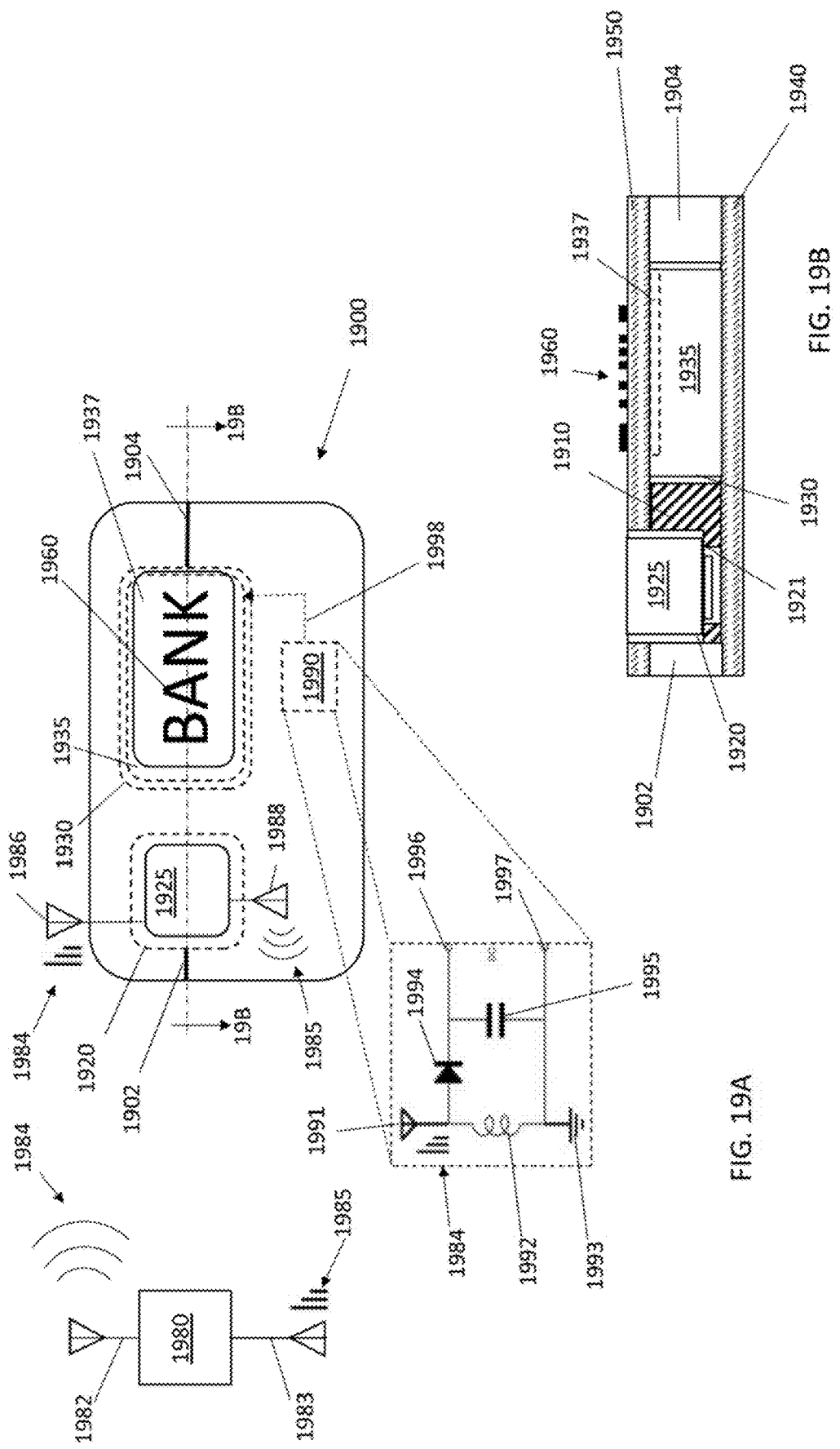

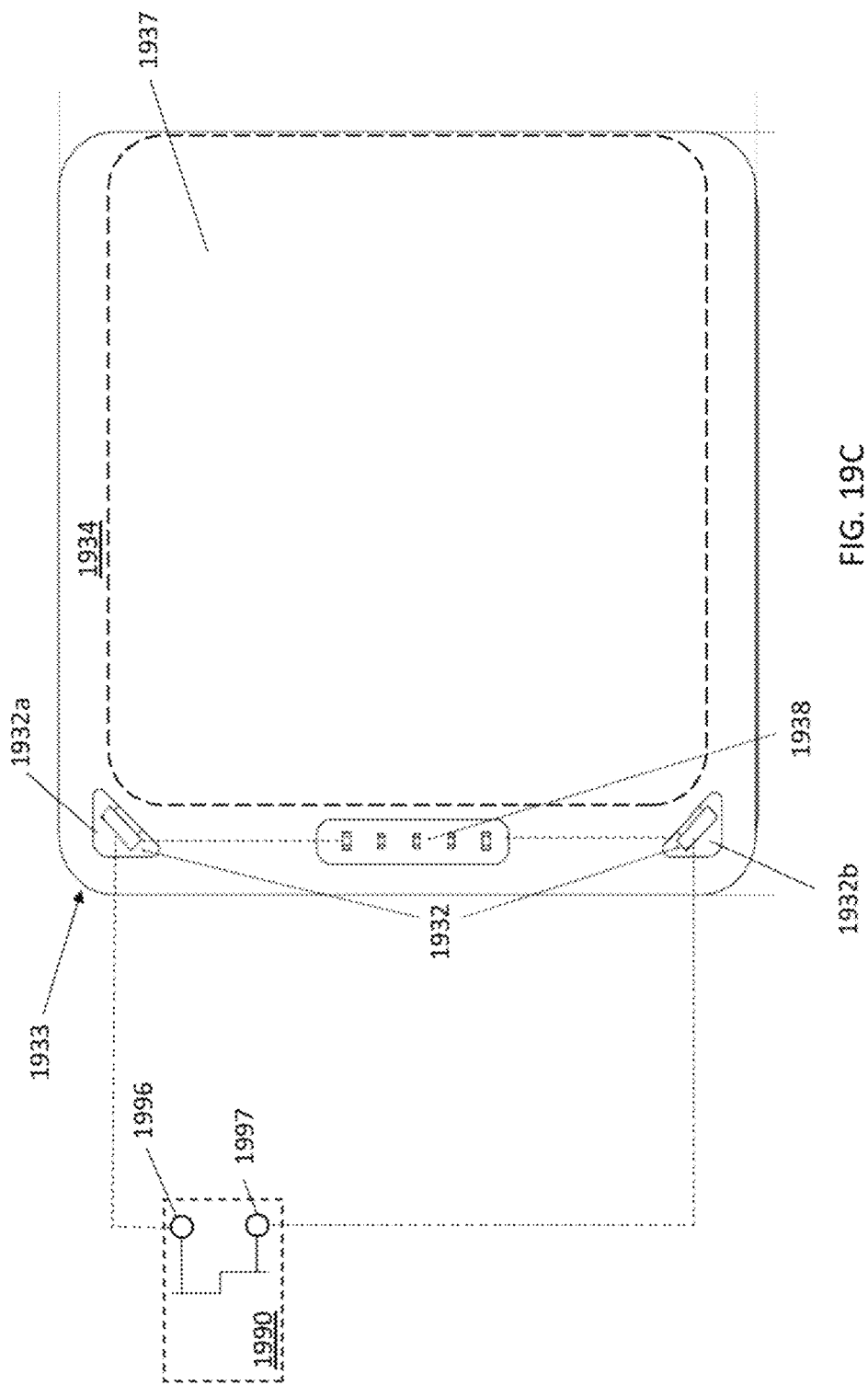

METAL, CERAMIC, OR CERAMIC-COATED TRANSACTION CARD WITH WINDOW OR WINDOW PATTERN AND OPTIONAL BACKLIGHTING

CROSS REFERENCE TO RELATED APPLICATIONS

This application is a continuation of U.S. patent application Ser. No. 16/751,285, filed Jan. 24, 2020 (status: allowed), which is a continuation-in part of PCT Application Ser. No. U.S. Ser. No. 18/052,832, filed Sep. 26, 2018, titled METAL, CERAMIC, OR CERAMIC-COATED TRANSACTION CARD WITH WINDOW OR WINDOW PATTERN AND OPTIONAL BACKLIGHTING (status: pending), which claims priority from U.S. Provisional Application No. 62/573,789, filed 18 Oct. 2017, titled METAL, CERAMIC, OR CERAMIC-COATED METAL TRANSACTION CARD WITH TRANSPARENT OR TRANSLUCENT WINDOW; U.S. Provisional Application No. 62/610,745, filed 27 Dec. 2017, titled METAL, CERAMIC, OR CERAMIC-COATED METAL TRANSACTION CARD WITH WINDOW OR WINDOW PATTERN, and U.S. Provisional Application No. 62/686,358, filed 18 Jun. 2018, titled METAL, CERAMIC, OR CERAMIC-COATED TRANSACTION CARD WITH WINDOW OR WINDOW PATTERN AND OPTIONAL BACKLIGHTING. This application is also a continuation-in-part of U.S. application Ser. No. 16/124,711 ("the '711 Application"), filed Sep. 7, 2018 (status: granted as U.S. Pat. No. 10,885,419 on Jan. 5, 2021), which claims priority from U.S. Provisional Application No. 62/555,367, filed Sep. 7, 2017, both of which are titled TRANSACTION CARD WITH EMBEDDED ELECTRONIC COMPONENTS AND PROCESS FOR MANUFACTURE. The contents of all of the foregoing are incorporated herein by reference in their entirety for all purposes.

BACKGROUND OF THE INVENTION

Transaction cards may have any number of features to differentiate one offering from another. Consumers have demonstrated a demand for metal cards because of their durability and overall luxury feel relative to plastic. Ceramic cards offer similar durability with a unique and desirable overall luxury feel.

U.S. Pat. Nos. 5,412,199; 5,434,405; 5,608,203, discloses a credit card having a plastic base material with a transparent area that forms a magnifying lens, such as a Fresnel lens, that permits the card to be used as a magnifying glass, such as for being able to read small print on transaction receipts. U.S. Pat. No. 6,902,116, discloses a transaction card having a transparent window in which the window has collimating properties to focus LED light.

U.S. Pat. No. 7,997,503 discloses a card having a plastic base with a transparent window having a fixed set of elongated segments printed on it, which when superimposed over a display of dynamic visual code combined with the set of elongated segments, reveals the visual code to a viewer looking through the window. Thus, such cards have printed information on the window, and the printed information on the window is functional in nature, in that the pattern must align with the elongated segments that are combined with the visual code.

Providing a card that is primarily metal, ceramic, or a ceramic-coated body, such as metal, enables cards with a certain look and feel (e.g. heft) not available with a plastic card, and providing a transparent window in such cards provides a desirable differentiation from other card offerings. Metal and/or ceramic cards are generally more expensive to produce, and therefore may be presented as a luxury card targeted to card holders who have a net worth above a certain threshold, who are members of a select group of high-value customers to the card issuer, and/or who are willing to pay a substantial annual fee. A carrier of such a luxury card may not wish to admit of any need for a magnifying glass, and thus may not desire for a transparent window with magnification or collimation. The carrier of such a card may prefer that the majority of the center of the transparent window have no printing that obscures the view through the card, or that the window be adorned with a decorative, non-functional pattern, rather than the functional pattern of elongated segments, such as the patterns described in U.S. Pat. No. 7,997,503, which patterns tend to be aesthetically unpleasing. Embedding a transparent window in a metal and/or ceramic frame may present different manufacturing and structural challenges and opportunities different from the types of cards described in the references noted above.

Users and producers of cards frequently wish to incorporate designs that are visibly and/or tactilely perceptible from at least one surface of a card. For example, U.S. Pat. App. Ser. No. 20060086802 discloses a gemstone-carrying card in which gemstones are embedded in a plastic card. Card issuers and cardholders may have an interest in creating designs that provide a look similar to a pattern of gemstones, without the labor-intensive steps and expense of having to embed numerous multiple individual gemstones in the card.

SUMMARY OF THE INVENTION

One aspect of the invention comprises a transaction card having opposite finished surfaces and a periphery, the transaction card comprising a metal layer having opposite surfaces and at least two openings, each opening extending through one or both of the opposite finished surfaces, a transponder module disposed in one of the at least two openings in the metal layer and an LED module disposed in another of the at least two openings in the metal layer and having a planar illuminated area visible from a finished surface of the transaction card. The transponder module comprises a component in a transaction circuit configured to communicate wirelessly with a card reader that is configured to emit radio frequency (RF) waves having energy. The transaction circuit is configured to receive an incoming RF signal from the card reader, to respond with an outgoing RF signal, and to power the transaction circuit by harvesting energy from the RF waves. The LED module comprises one or more LEDs configured to emit light, and a light guide for distributing the light emitted by the one or more LEDs across the illuminated area. In some embodiments, the LED module comprises a component in an illumination circuit configured to harvest energy from the RF waves for powering the one or more LEDs. The illumination circuit may be configured to illuminate independent of status of a payment transaction performed by the transaction circuit. In other embodiments, the illumination circuit and the transaction circuit may comprise components in a unified circuit in which the illumination circuit is configured to illuminate in a manner indicative of a status of a payment transaction performed by the transaction circuit.

The metal layer may have at least one discontinuity extending from the periphery of the card to at least one of the at least two openings in the metal layer. At least one discontinuity may be connected to and extend between the at least two openings. The metal layer may have a first discontinuity extending from the periphery of the card to the opening containing the transponder module, and a second discontinuity extending from the periphery of the card to the opening containing the LED module. The card may further comprise at least one non-metal layer disposed on each of opposite surfaces of the metal layer. A printed pattern may overlie the illuminated area of the LED module. The LED module may be located in the metal layer in a position that improves RF performance of the transponder module relative to a card without the LED module.

The illumination circuit may be configured to have a variable illumination characteristic dependent upon a characteristic of the harvested energy. For example, the illumination circuit may comprise at least one LED having a variable intensity, wherein the LED is configured to illuminate with a first, relatively lower intensity in response to harvested energy in a first, relatively lower range and to illuminate with a second, relatively higher intensity in response to harvested energy in a second, relatively higher range. An illumination circuit with at least two LEDs may be configured to illuminate one of the at least two LEDs in response to harvested energy in a first, relatively lower range and to illuminate the other of the at least two LEDs in response to harvested energy in a second, relatively higher range. The first range and the second range may be overlapping, such that the illumination circuit is configured to illuminate both of the at least two LEDs when the harvested energy is in the overlapping range. The at least two LEDs may each be configured to emit a same wavelength of light, or at least one of the at least two LEDs may be configured to emit a different wavelength of light than the other of the at least two LEDs. For example, one of the at least two LEDs may be configured to generate a wavelength in the green visible spectrum of light and another of the at least two LEDs may be configured to generate a wavelength in the red visible spectrum of light. In such an embodiment, the illumination circuit may be configured to illuminate the red LED in response to harvested energy in a first, relatively lower range, to illuminate the green LED in response to harvested energy in a second, relatively higher range, and to illuminate both the red LED and the green LED when the harvested energy in response to harvested energy in a third, intermediate range between the first, relatively lower range and the second, relatively higher range. One or both of the red LED and the green LED may be configured to illuminate with variable intensity.

Yet another embodiment may comprise a transaction card having a metal layer with a visual appearance, a thickness, a metal layer front face, a metal layer back face, and one or more windows or pockets extending through at least the front face. A transponder module and an insert may be respectively disposed in the one or more windows or pockets. A front face of the insert visible through the window has a different visual appearance than the metal layer. One or more non-functional features is visible from a front surface of the card in contrast to the visual appearance of the insert front-facing surface disposed beneath the non-functional features. The insert is one of: (a) non-transparent and non-translucent; or (b) transparent or translucent, and configured to transmit backlighting to the non-functional features through a back surface of the card. The insert is located in the metal layer in a position that improves RF performance of the transponder module relative to a card with an absence of the insert. In some embodiments, the non-functional features comprise printed features. In some embodiments, the insert is non-transparent and non-translucent, but has an illuminable front-facing surface. The insert may comprise an illuminable LED display, such as an illuminable LED display powered by energy harvested from RF waves. In embodiments in which the metal layer has at least two openings, a transponder module may be disposed in one of the at least two openings and the insert may be disposed in another of the at least two openings.

The transponder module may include a transaction circuit configured to couple the transponder module inductively to a card reader using RFID technology. The illuminable LED display may be configured to illuminate as an indicator of card operability, or to illuminate independent of status of a payment transaction performed by the transaction circuit. In an embodiment, in which the insert is translucent or transparent and the window extends from a front surface of the metal layer to a back surface of the metal layer, non-collimated light may passes through the insert to provide the contrast with the one or more non-functional features visible from a front surface of the card. The non-functional features may comprise at least one of printed features, engraved features, etched features, or cut features. The window or pocket may comprise a plurality of openings in the front face of the metal layer that define the one or more non-functional features disposed within a first area. At least one opening in the back face of the body may be aligned with the first area, and the insert may be disposed in the at least one opening in the back face of the body positioned with the front-facing surface of the insert recessed relative to the metal layer front face such that the front-facing surface of the insert is visible through the plurality of openings in the front face of the metal layer. A backing layer may be laminated to the back face of the body. A portion of the insert or the opening containing the insert may be partially obscured by printed or decorative content. A first discontinuity may extend from the periphery of the card to the opening containing the transponder module, with a second discontinuity extending from the periphery of the card to the opening containing the LED module.

The illuminable LED display may comprise one or more LEDs configured to emit light, and a light guide for distributing the light emitted by the one or more LEDs across an illuminated area of the front-facing surface of the insert, or an OLED module. The illuminable LED display may have a variable illumination characteristic dependent upon an amount of energy harvested, including one or more LEDs with variable intensity and/or configured to emit the same or different wavelengths and/or configured to illuminate in different combinations, as described in more detail herein.

BRIEF DESCRIPTION OF THE DRAWINGS

FIG. 2 depicts an exemplary sheet from which a plurality of the cards of FIG. 1A may be cut.

FIG. 3 depicts an exemplary card with a window having electronics disposed thereon.

FIG. 4 depicts an exemplary card with a multi-layer window having embedded electronics.

FIG. 5 depicts an exemplary card with a window having embedded electronics.

FIG. 6 depicts an exemplary card with a window having embedded electronics and an embedded antenna.

FIG. 10A depicts a plan view of an exemplary card having a plurality of window openings cut into a pattern.

FIG. 11 depicts a cross-sectional view of an exemplary card having a plurality of window openings on the front face.

FIG. 12 depicts a cross-sectional view of the exemplary card of FIGS. 7-9.

FIG. 13 depicts a cross-sectional view of the window region of an exemplary card embodiment in which the plurality of window openings are filled or partially filled with protruding insert material.

FIG. 14 depicts a cross-sectional view of the window region of an exemplary card embodiment in which the plurality of window openings are filled or partially filed with a translucent or transparent material different than the insert material.

FIG. 15 depicts a cross-sectional view of the window region of an exemplary card embodiment in which the plurality of window openings are filled or partially filed with a translucent or transparent material protruding from a layer or coating disposed on the front face.

FIG. 16 depicts a cross-sectional view of the window region of an exemplary card embodiment in which the plurality of window openings are filled or partially filed with a translucent or transparent material protruding from a layer or coating disposed beneath the front face.

FIG. 17 depicts a cross-sectional view of the window region of an exemplary card embodiment in which a plurality of window openings are filled or with a translucent or transparent material from layers or coatings disposed on top of the front and back faces.

FIG. 18 depicts a cross-sectional view of a window region of an exemplary card embodiment in which a light guide transmits light through the plurality of window openings.

FIG. 19A depicts a plan view of an exemplary transaction card comprising a printed design backlit by an LED module.

FIG. 19B depicts a cross-sectional view of the card of FIG. 19A.

FIG. 19C depicts an exemplary LED module comprising a light guide with side-fire LEDs.

DETAILED DESCRIPTION OF THE INVENTION

Figure 1B:
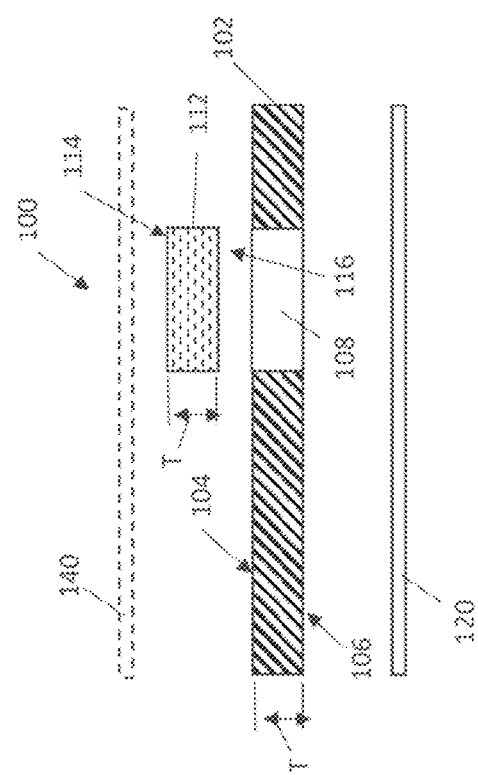
FIG. 1B depicts an exploded cross-sectional view of the card of FIG. 1A.
Figure 1A:
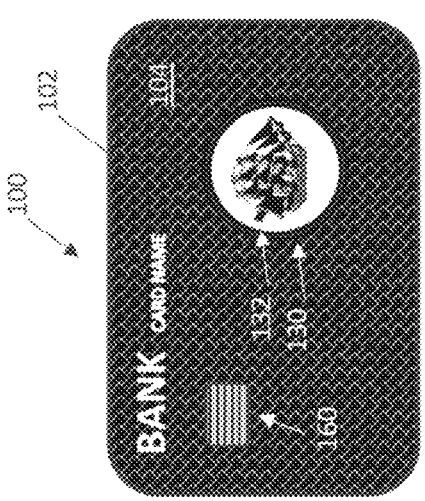
FIG. 1A depicts the front face of an exemplary transaction card in accordance with one aspect of the invention, having a transparent window.
Figure 1C:
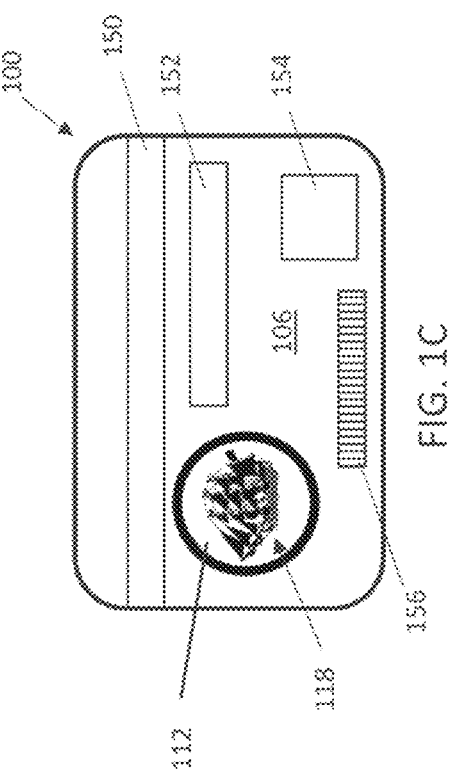
FIG. 1C depicts the rear face of the card of FIG. 1A.

Referring now to the drawings, FIGS. 1A-1C depict an exemplary transaction card 100 comprised of a relatively thick body 102, a window insert 112, and a backing layer 120. Body 102 has a thickness (T), a front face 104, a back face 106, and a hole 108 extending from the front face to the back face. As depicted in FIGS. 1A and 1C, hole 108 has a circular periphery, but it should be understood that the periphery of the hole may take any geometric form (oval, triangular, square, rectangular, or any regular or irregular polygonal form having 3 or more sides), or it may have a periphery comprising a combination of curved and/or linear sections that do not conform to any of the foregoing geometric categories. It should also be understood that the transparent or translucent window(s) may be any size as characterized by its overall area, so long as its overall area is less than the area of the body 102, and preferably fully contained within the area of the card (i.e. the periphery of the window is located entirely radially inward of the periphery of the body).

Non-magnifying window insert 112, having a front face 114, back face 116, the same thickness (T) as the body 102, and a periphery matching the periphery of hole 108, is disposed in the hole. The window may be both non-magnifying and non-collimating. By "matching" periphery, it is meant that the window insert has an identical periphery as the periphery of the hole, but is sufficiently smaller in diameter (or the equivalent thereof) to be inserted in the hole without having to force fit it, leaving no gap, or a gap that is minimal and nearly imperceptible to the human eye, at the interface between the inside edge of the hole and the outer edge of the insert. Similarly, by the "same" thickness, it is meant that the window insert and the metal body are of the same thickness to a desired level of precision within an acceptable tolerance, recognizing that such a tolerance may include a difference in thickness that is perceptible to the human touch or a difference in thickness that accounts for the thickness of the printed layer on the body.

In some embodiments, the window insert is devoid of functional printed content on either its front or back face (or embedded therein). By "devoid of functional printed content," it is meant that the insert in some embodiments has no content printed on it whatsoever (not shown), or in other embodiments, any content printed thereon (e.g. ship graphic 118 depicted in FIG. 1) is purely decorative in nature and not, for example, for use in connection with an authentication or verification scheme implemented by placing the window over a corresponding graphic. Instead of or in addition to printing, the graphics or other content disposed in the window may also be engraved, etched, or otherwise cut into the window. Engraved, etched, or otherwise cut content in the window may also be non-functional, including aesthetic content in the nature of 3D reliefs, such as to provide a cameo-like appearance. In other embodiments, as described further herein, the window may comprise electronics (e.g. an LED) mounted thereon or therein, in which case preferably "invisible" or minimally visible (not visible to the naked human eye in ambient lighting without careful inspection) traces may be printed or otherwise disposed on or in the window. Such traces may connect the LED to electrical traces in the body, which traces in the body may connect to a concealed power source in the body or may connect to a source and/or recipient of electrical signals. In some embodiments, the LED may comprise a backlit LED. The window may comprise a light guide that transmits light from a light source, such as an LED located at an input surface of the light guide to an output surface of the light guide. While it is understood that all electrical signals have some inherent power, the term "power" as used herein refers to power for powering the electrical feature, whereas the term "electrical signals" as used herein refers to a signal that is not for providing power, but rather for communicating information. Thus, the electrical impulses traveling to and from the electrical feature to any connected components may comprise power, electrical signals, or a combination thereof.

By "non-magnifying," it is meant that the window insert is not functional as a magnifying lens (i.e. objects at a given distance viewed through the window insert appear the same size than if not viewed through the window). By non-collimating, it is meant that the window does not focus radiation of any wavelengths (not limited to visible light) that pass through the window toward a focal point. The window may be light dispersing. The window insert is non-metal, and preferably comprises polished polycarbonate, but may comprise glass or any transparent plastic or resin known in the art. In some embodiments, the window insert may have a primarily transparent or translucent region with one or more different materials inlaid inside it, such as for example, metal, ceramic, wood, crystal, genuine or synthetic gemstones, mother-of-pearl, leather, or the like. Although referred to herein as "transparent," the window may cause sufficient light scattering and diffusion that objects viewed through the window are not visible with perfect clarity. The window alone is more transparent than the combination of the window and the backing layer (and any layers on top of the window). The materials of the window insert may be selected to lie anywhere in the range between translucent (where objects viewed through the window cannot be seen clearly at all) and transparent (where objects viewed through the window can be seen clearly). At a minimum, the window is translucent to the spectrum of light visible to the typical human eye (i.e. wavelengths from about 390 to 700 nm; and frequencies in the range of about 430-770 THz). In preferred embodiments, the window is not tinted. Thus, for example, when stacked in a cardholder's wallet, the window may permit the user to see the card located immediately below it with some clarity.

In some embodiments, it may be desirable for the window to be electrically conductive or to have electrically conductive features. For example, in some embodiments, the window may comprise glass or another non-conductive material, such as a plastic resin, coated with a conductive coating, such as an indium-tin-oxide coating or an electrically conductive ink. In other embodiments, the window may comprise in whole or in part an electrically conductive plastic (i.e. polycarbonate or another plastic material formed from a conductive plastic resin).

In some embodiments, as depicted in FIGS. 3 through 6, card 300, 400, 500, 600 may have electronics 310, 410, 510, 610 such as an integrated circuit, an LED inlay, a switch, or any other electronic feature known in the art, incorporated in the window 320, 420, 520, 620 with "invisible" traces 330, 430, 530, 630 comprising ITO or other printed conductive inks or adhesives, which may connect the electronics to electrical connections 340, 440, 540 at the interface between the window and the body 350, 450, 550 at the periphery of the hole. In some embodiments, the electrical connections 340, 440, 550 may then connect to a power source 360, 460, 560, such as a battery or an antenna for harvesting RF power. Thus, for example, an LED display, such as for showing a dynamic code, or for emitting light to provide an indicator of card operability (e.g. illuminated when information is being actively read from the card), may be bonded to or embedded in the window and connected to connection points at the edge of the window with ITO or other printed traces. Electronics may be bonded to the window with a conductive adhesive in whole or just in portions requiring conductivity and/or with non-conductive adhesive in whole or just in portions intended to be non-conductive). The use of printed conductive traces using a thin conductive material that is transparent, translucent, or minimally visible, allows incorporation of electronics in the window without unsightly, readily visible wires or copper traces.

In embodiments with an electrically-powered feature in the window, in which power is supplied to the feature from a power source embedded in the body, as depicted in FIGS. 3 through 5, the power may connect to the feature inductively or by physical traces, wherein physical traces in the body connect to physical traces in the window across a conductive interface that bridges any gap between the window and the body. The conductive interface 335, 435, 535 may comprise, for example, solder, wire bonding, conductive ink or a conducting adhesive (such as a conducting adhesive patch or ACF tape). The conductive interface 335, 435, 535 and any traces 340, 440, 540 embedded in a metal body 350, 450, 550 are insulated from the metal body by any insulation and methods for disposing the insulation, known in the art. For example, as is known in the art, traces 340, 440, 540 may comprise copper traces disposed on a flexible non-conductive substrate disposed in a groove in the body. The conductive interface may simply comprise connecting endpoints of the connecting traces (e.g. 330 and 340) or may be somewhat larger than the connecting traces to facilitate alignment when the window is inserted in the hole. Applying the conductive interface 335, 435, 535 in the form of a solder bump applied to bridge the gap between traces 330, 430, 530 in the window and traces 340, 440, 540 in the card after insertion of the window may be particularly effective. To facilitate alignment of electrical connections, the hole and corresponding insert may be non-round or may be keyed, such as with a protrusion in the window that mates with an indent in the hole (or vice versa), so that the insert fits the hole in only a single or limited number of readily differentiated orientations.

In the embodiment depicted in FIG. 6, the electronic feature 610 disposed in the window 620 may be powered entirely by harvesting RF from a card reader inductively, wherein antenna 630 is also disposed in the card and connected to the electronic feature without a need for connection to a power source embedded in the body 650. Thus, for example, wherein electronic feature 610 is an illuminating feature activated when the card is being read, antenna 630 harvests sufficient electricity to power the light and needs no connections to any other features embedded in the card. In other constructions, electronic feature 610 and/or antenna 630 may be disposed on a surface of the card rather than embedded. In other embodiments, electronic feature 610 and/or antenna 630 may be connected inductively (or physically by connections akin to any of those shown in FIGS. 3 through 5) to features embedded in the body, such as a power source or, for example, in an embodiments in which the electronic feature is a dual-interface chip, to contacts (e.g. contacts 160 depicted in FIG. 1) for being read by a contact-based reader.

Window Pattern Embodiments

In another aspect of the invention, the transaction card may comprise a plurality of openings in the front face of the card, as depicted in FIGS. 7-17. Specifically, as shown in FIG. 10A, the plurality of window openings 1010 in card body 1000 form a geometric graphic pattern in the shape of a sphere. As shown in FIG. 10B, the plurality of window openings 1022, 1024, 1032 in card 1020 collectively form an alphanumeric character in the shape of a stylized Q associated with a particular brand of card. As shown in FIG. 10C, each of the plurality of window openings 1052 comprises an alphanumeric character arranged together such that the window openings spell a word associated with a particular brand of card. The openings are depicted generically in FIGS. 7-9 as a collection of different ellipses, and in the cross-sections of FIGS. 11-15, they have no identifiable geometry. The pattern and the shapes, sizes, and number of openings that form the pattern, are not limited in any way. The openings may form a recognizable pattern or an abstract pattern. The openings are preferably merely aesthetic in nature and do not serve any function other than to create a suitable pattern or design, which pattern or design may be user-selected or may be selected for difficulty of reproduction. Thus, while the pattern or design may enhance security of the card in a passive way in that the pattern or design by its very existence provides a mark of authenticity that is difficult to reproduce, preferred patterns or designs are referred to herein as "non-functional" because they have no active or interactive functionality.

Figure 7:
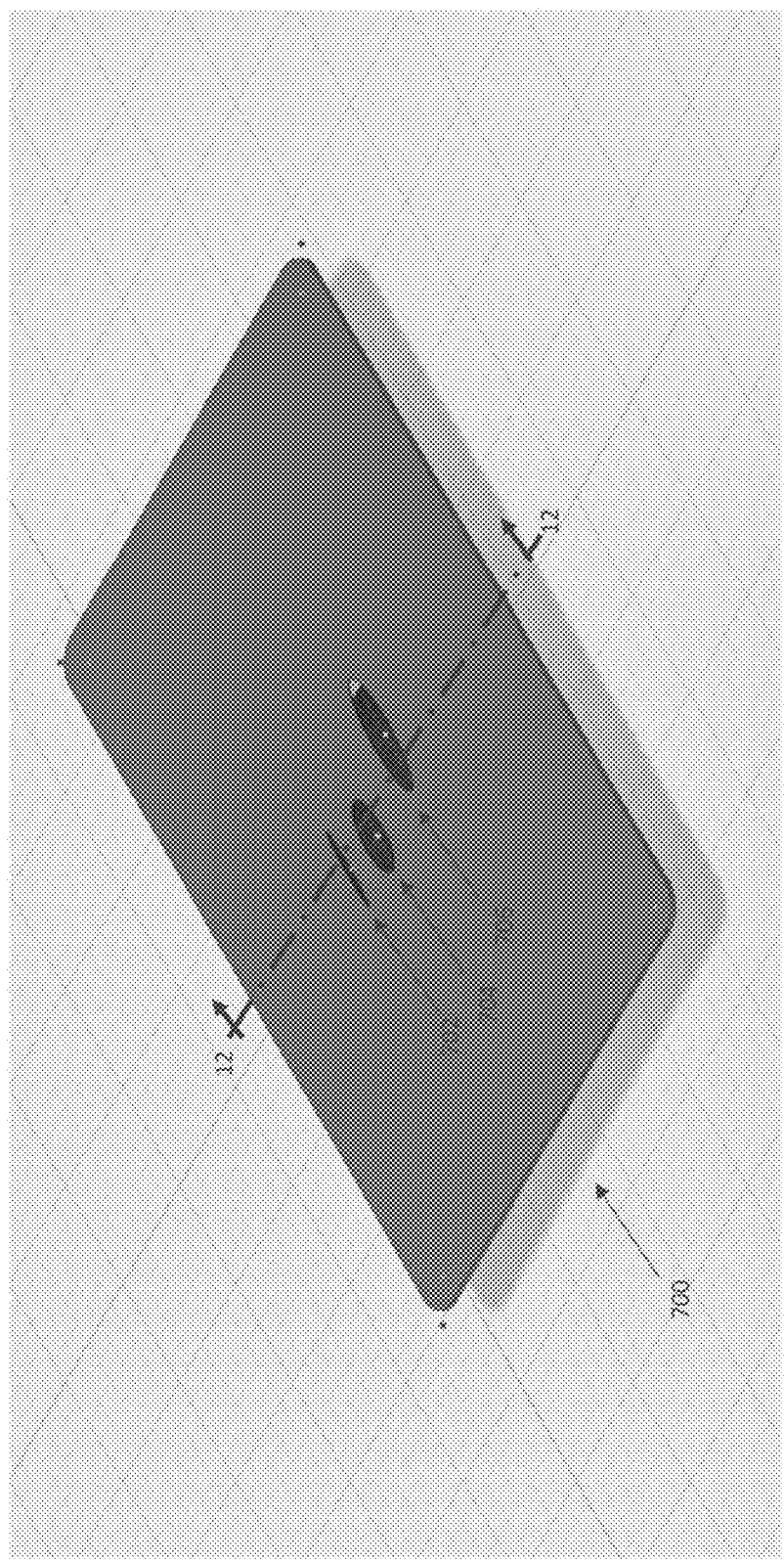
FIG. 7 depicts a perspective view of a front face of an exemplary card embodiment having a plurality of window openings.
Figure 8:
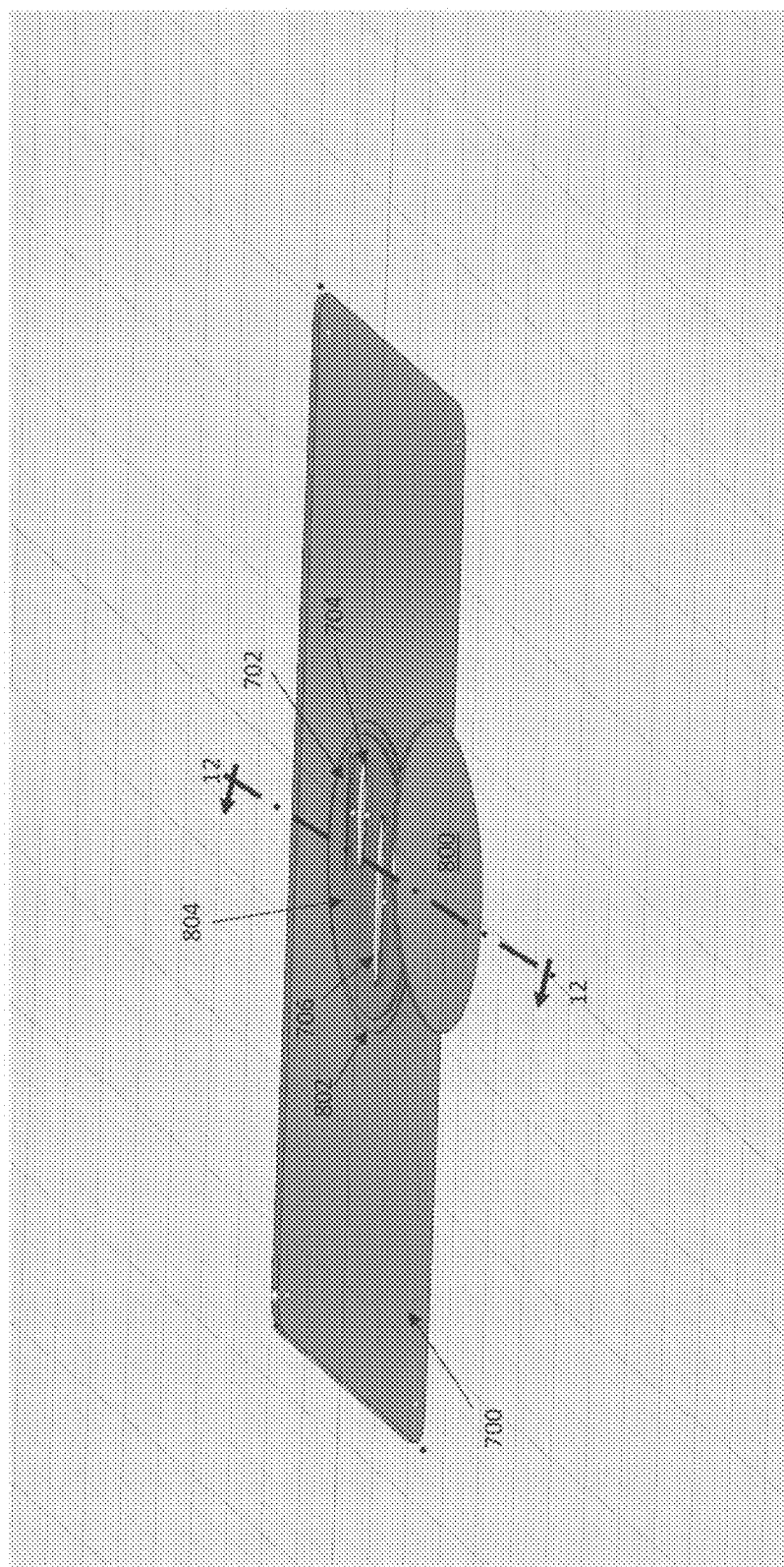
FIG. 8 depicts a perspective view of the back face and insert of the exemplary card of FIG. 7.
Figure 9:
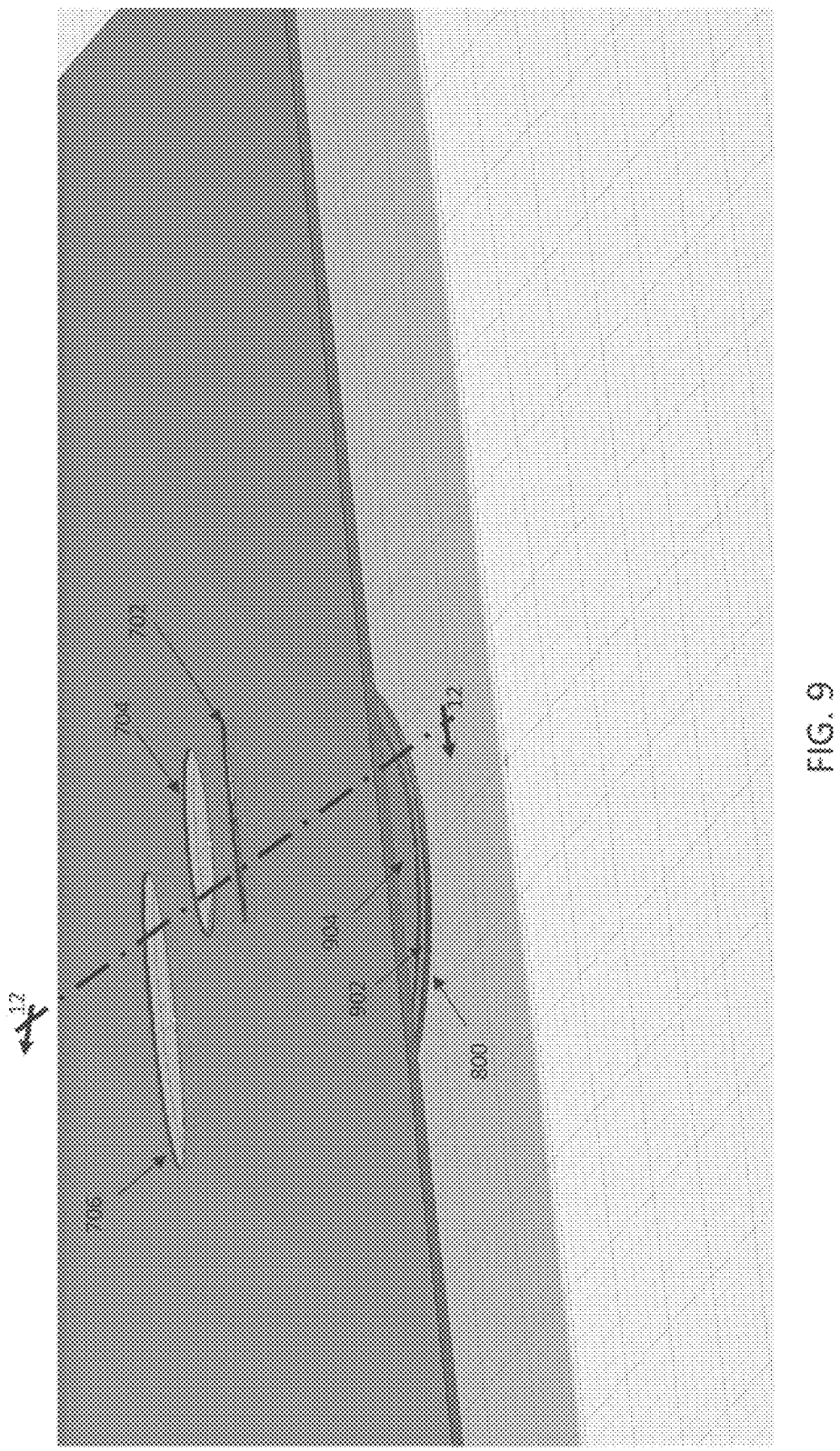
FIG. 9 depicts a perspective close-up view of the body front face and insert front face and outer periphery of the exemplary card of FIG. 8.

As depicted in FIGS. 7-9, card body 700 has a plurality of window openings 702, 704, and 706 that penetrate the front face of the card body. Although referred to as the "front" face here and in the claims that follow, the term "front" as used herein in connection with this and other embodiments refers to the side of the card on which the window openings are disposed, which may be side traditionally referred to as the "front" or the "back" side of a functioning card having a magnetic stripe, contacts, and other indicia that may be typically understood to differentiate the "front" and the "back" of the card. Each opening has a different periphery visible from the front side of the card, but all of the windows are located in an area defined by pocket 804, depicted in FIG. 8, which pocket defines a single opening in the back face of the card. Insert 800 is configured to be disposed in pocket 804. As depicted in FIGS. 8, 9 and 12, card body 700 has a recessed ledge 802 in the back face surrounding the single opening 804, wherein the insert 800 comprises a stepped periphery comprising an outermost region 902 having a geometry configured to mate with the recessed ledge, and an innermost region 904 configured to fit within the single opening.

In another embodiment, depicted in FIG. 11, the body may comprise at least two layers, including a first layer 1100 that defines the front face 1150 of the body, and a second part 1102 that defines the back face 1152 of the body. The plurality of openings 1110a, 1110b, 1110c penetrate the entire thickness of the layer 1100, whereas a single opening 1120 penetrates the entire thickness of layer 1102. Insert 1104 is configured to fit within opening 1120, which defines a pocket when layers 1100 and 1102 are combined together. Although not shown with a recessed ledge in layer 1102, and corresponding outer peripheral region on insert 1104, this feature may also be present in this embodiment. Although depicted as having the same thickness in FIG. 11, the two layers 1100 and 1102 may have different thicknesses, and either one may be larger than the other. The layers may be adhesively bonded together. Additional layers may also be present, including a transparent or translucent bonding layer between layers 1100 and 1102, that when fills the plurality of openings 1110a-1110c during a lamination step. Backing layer 1106 may be laminated or otherwise bonded to the back face of the layer 1102 to keep insert 1104 in place.

As shown in FIG. 11, the insert may consist of member 1104 alone. In some embodiments, member 1104 and backing layer 1106 (and any intermediate or over layers) may be transparent or translucent, such that light is visible through the openings 1110a-1110c. In preferred, embodiments, however, insert 1104 comprises a non-transparent member that is chosen for aesthetic impact. For example, insert 1104 may comprise plastic, metal (e.g. having different visual properties than any visible metal in the body), ceramic (e.g. having different visual properties than any ceramic or ceramic coating comprising the body), wood, crystal, mother-of-pearl, stone (including artificial or natural gemstone), natural or synthetic bone or ivory, and natural or synthetic leather. Any of the foregoing may have printing on them (e.g. a printed plastic insert having a graphic that provides visibility into different colors through different openings). Typically, the non-transparent member is opaque, but in other embodiments, it may have some translucence. Member 1106 may have printing on one or both sides, including in some embodiments, printing visible from one surface of the card that is different from the printing visible from the opposite surface of the card.

Typically, member 1104 is passive and static, but it may be dynamic, such as a member that is photoluminescent (e.g. that glows in the dark or fluoresces when illuminated by light of a certain wavelength). Member 1104 may also be a light source, such as an LED, such as more specifically a backlit LED, connected to a power source (not shown) in the same way as described herein for other elements connected to a power source. In still another embodiment, member 1104 may be a light guide that receives light input from a light source, such as an LED or backlit LED (not shown), at an input surface of the light guide and transmits the light to an output surface. The light may cooperate with the windows to create a pattern that illuminates to indicate, for example, reading of the payment module, but is not limited to any particular purpose.

In still another embodiment, member 1104 may comprise on OLED (organic light emitting diode). The use of OLED components in transaction cards, generally, has been described in, for example, U.S. Pat. No. 9,665,818, titled "ORGANIC LIGHT EMITTING DIODE ("OLED") UNIVERSAL PLASTIC" and in PCT Publication No. WO2013131153A1, titled FLEXIBLE OLED CARD, both of which are incorporated herein by reference. Although the referenced disclosures describe use of OLED technology in connection with flexible plastic cards, it should be understood that the general technology for providing an OLED display is applicable for incorporation of OLED displays into relatively non-flexible card constructions or flexible card constructions. The flexibility of OLED displays may be particularly useful, however, in connection with overall card constructions having enhanced flexibility (such as flexibility exceeding the ISO/IEC 7810ID-1 standard for transaction cards or meeting or exceeding the ISO/IEC 15457 standard for thin, flexible cards). Flexible card constructions using OLED displays may further include flexible circuit boards. The term "LED" as used herein with reference to a display should therefore be interpreted as referring to an OLED or a non-organic LED.

In other embodiments, member 1104 may be an active or dynamic member such as is described in U.S. Prov. App. Ser. No. 62/545,630, titled "CARD WITH DYNAMIC SHAPE MEMORY ALLOY TACTILE FEATURE," incorporated herein by reference. Member 1104 may be different from the body in any number of ways, including color, texture, reflectance, opacity, and combinations thereof. Member 1104 may include a display and a processor configured to generate a dynamic security code on the display, such as is described in '711 Application. Any or all of the electronic components described herein may be embedded in the card in any way known in the art, including the methods as described in the '711 Application or in U.S. Pat. No. 10,406,734, filed Oct. 18, 2018, claiming priority from U.S. application Ser. No. 16/320,597, filed Jan. 25, 2019, both titled "OVERMOLDED ELECTRONIC COMPONENTS FOR TRANSACTION CARDS AND METHODS OF MAKING THEREOF" and both incorporated herein by reference, As depicted in FIG. 12, the insert may consist of only a single member 800 in which, when the card is assembled, an entirety of the front-facing surface of the member is disposed recessed relative to the body front face, meaning the plurality of windows 702-706 are tactilely perceptible in the front face of the card. Thus, for example, when the insert 800 comprises mother-of-pearl, lamination of the card will not change this physical relationship among the components. Although preferably non-transparent, member 800 may be transparent in some embodiments.

In other embodiments, however, as depicted in FIG. 13, the insert 1302 may comprise a material that is flowable at lamination temperatures, and that may partially or fully flow into the plurality of openings in body 1300 during a lamination step, such that a plurality of portions 1304, 1306, 1308 of the front-facing surface of the non-transparent member protrude into the plurality of openings and are disposed flush with the front face of the body.

In still other embodiments, depicted in FIG. 14, an entirety of the front-facing surface of the non-transparent member 1402 may remain disposed recessed relative to the body front face, and a plurality of transparent or translucent members 1404, 1406, 1408 may be disposed in the openings. The transparent or translucent members may comprise an optically clear epoxy that is deposited via automated dispensing in the openings.

In yet other embodiments, depicted in FIG. 15, a transparent or translucent layer 1510 may be disposed over the front face of the body 1500 and over the plurality of openings such that protrusions 1504, 1506, and 1508 from the layer fully or partially flow into the openings during a lamination step, with layer 1502 remaining in its entirety recessed relative to the body front face.

As depicted in FIG. 16, in a multilayer body construction, an intermediate transparent or translucent bonding layer 1610 may be disposed between the first layer 1500 and second layer 1502 of the body such that protrusions 1604, 1606, and 1608 fully or partially flow into the openings during a lamination step, with layer 1620 remaining in its entirety recessed relative to the body front face.

As depicted in FIG. 17, transparent or translucent layers 1702 or 1704 disposed over the front face and back face of body 1700, respectively, may together fully or partially flow into the openings 1710, 1712 during a lamination step. This structure and manufacturing method may be particularly well suited for embodiments in which openings 1710 and 1712 are slits, such as the window features 1022, 1024, 1032, 1052 depicted in FIGS. 10B and 10C. Although shown with upper and lower layers, some embodiments may have only one or the other. Although shown with a single discrete upper and a single discrete lower layer, some embodiments may have multiple layers above and/or below the body, and in some of those embodiments, more than one of the layers may contribute to filling the openings. For example, an adhesive layer, which may comprise a carrier with adhesive on both sides, may be interposed between the body and each of the upper and/or lower layers, and the adhesive, the carrier, and the upper or lower layer may all flow into the openings during a lamination step. In other embodiments, adhesive on the underside of the carrier (or disposed directly on the underside of the upper and/or lower layers) may be the only material that flows into the openings.

Although shown with coplanar faces in FIG. 17, it should be understood that the flow of material may lead to convex, concave, coplanar, or irregular shaped surfaces of the flowing material on one or both faces of the card. The formation of convex, concave, coplanar, or irregular shaped surfaces may occur in any embodiments in which material flows into the windows/grooves/pockets, and the overall shape may be deliberately controlled to have a particular shape. Similarly, in embodiments in which inserts are pre-formed and assembled into the window/grooves/pockets, the inserts may also conform to any of the foregoing shapes.

Although all of FIGS. 13-17 depict a monolithic body, it should be understood that the body in these embodiments may comprise a multi-layer body, such as is depicted in FIG. 11.

Referring, for example, to FIG. 12, methods and processes for making cards with a window pattern may comprise providing a metal, ceramic, or ceramic-coated body 700) and creating a pocket 804 in the body having a periphery and extending from the back face to a location adjacent the front face; then creating a plurality of openings 702, 704, 706 extending from the front face into the pocket, the plurality of openings forming a pattern. Insert 804 is positioned in the pocket, and then a non-metal backing layer 1206 adjacent the back face of the body and a back face of the insert is laminated to the body and the insert.

In some embodiments, such as depicted in FIG. 11, the step of providing the body may comprise providing a first layer 1100 that defines the front face of the body and a second layer 1102 that defines the back face of the body. In such embodiments, the step of creating the pocket comprises creating a through hole 1120 in the second layer 1102, and the step of creating the plurality of openings comprising creating a plurality of through holes 1110a-c in the first layer 1100. The openings, pocket, and through holes referred to in these processes may be laser cut, milled, etched, or machined by any method known in the art. For ceramic-coated embodiments, a metal or other material body or body layers may be first coated with ceramic and then the various openings cut and the layers assembled, or the openings may be first cut in the metal or other body and/or the layers assembled, and then the ceramic coating may be applied to the outer surfaces before assembly of the rest of the components.

As depicted in FIG. 12, the process may comprise creating a recessed ledge 802 in the back face of the body surrounding the pocket 804, and forming the insert 800 with a stepped periphery comprising an outermost region 902 having a geometry configured to mate with the recessed ledge 802, and an innermost periphery 904 configured to fit within the pocket 804.

The step of positioning the insert in the pocket may comprise bonding the outermost region of the insert to the recessed ledge in the body, such as with an adhesive or via non-adhesive mechanical bonding, such as using ultrasonic welding, brazing, or soldering. Using the ledge design in conjunction with a bonding material such as an adhesive, solder, or a brazing alloy, permits bonding on the ledge in a way that minimizes the adhesive or other bonding material flowing into the openings in the front face of the body. In other embodiments, however, it may be desirable for the bonding material, such as a hard-drying clear epoxy, to flow into the openings and fill them to create transparent windows, such as is depicted in FIG. 14, in which case no ledge may be desired. Other methods of filling the plurality of openings with clear epoxy may include automatically dispensing the epoxy into the openings after the insert is already in place. Still other methods of filling the openings with a transparent or translucent material may comprise disposing a transparent or translucent coating (such as via lamination of a solid layer, or by application of a spray coating or a liquid layer) over the front face of the body and at least partially filling the plurality of openings with a portion of the clear coating that flows into the plurality of openings, such as during the lamination step.

As noted above, in embodiments in which the insert comprises a material that is flowable during lamination, the process may comprise conducting a lamination step at sufficient heat and pressure to cause protrusions from the insert to fully or partially flow into the plurality of openings during the lamination step. In embodiments with slits, such as those depicted in FIGS. 10B, 10C, and 17, the openings may be etched, milled, or created by a laser (although not limited to any particular manner of formation).

Figure 10B:
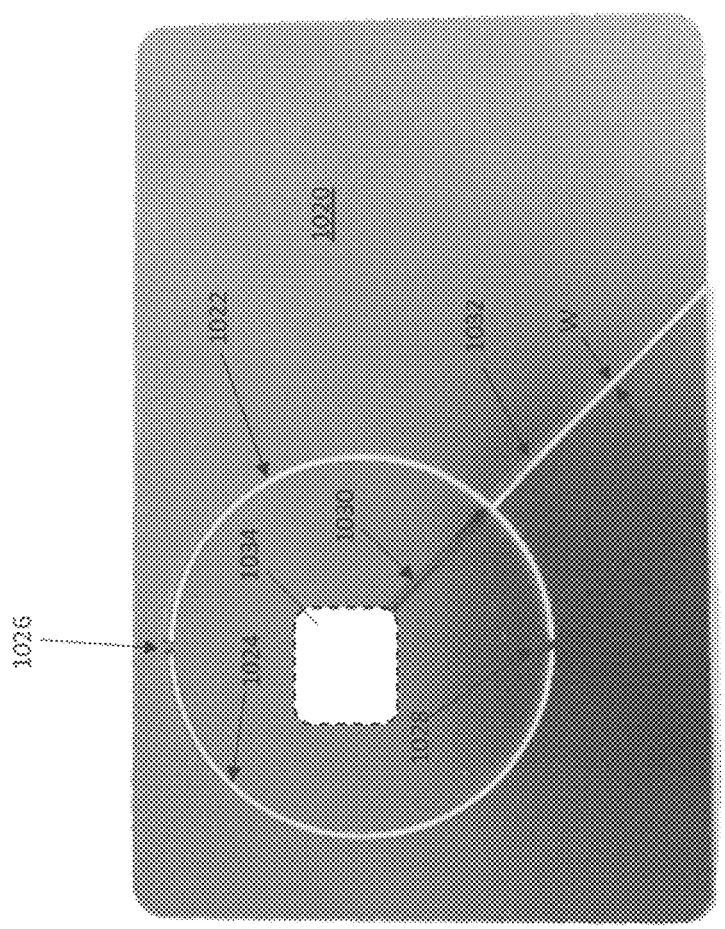
FIG. 10B depicts a plan view of an exemplary card having a plurality of narrow slit window openings cut into a pattern that collectively forms an alphanumeric character.
Figure 10C:
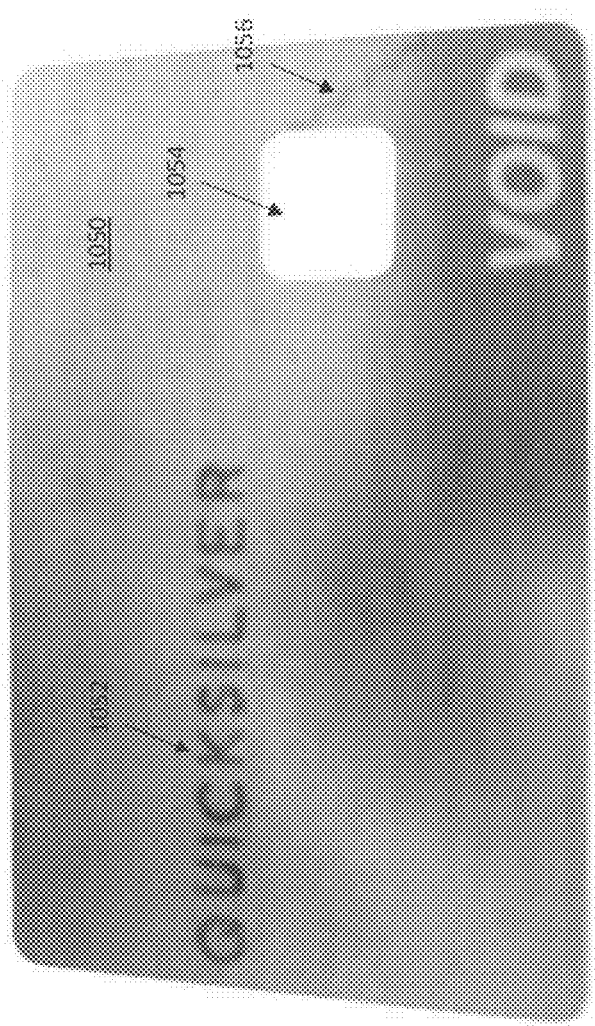
FIG. 10C depicts a plan view of an exemplary card having a plurality of narrow slit window openings each cut into a pattern of an alphanumeric character.

As depicted in FIG. 10B, for ease of manufacture, the step of creating the slit 1032 may include creating a continuous slit defined by portions 1030 and 1032 that extends from payment module pocket 1034 to an edge of the card. If portions of the slit are not desired to be transparent or translucent for aesthetic reasons, such as portion 1030, such portion may be filled with a different type of filler, such as a non-conductive filler that is not transparent or translucent. Such a fill step would be conducted prior to the lamination step that fills the transparent or translucent window portions. The continuous slit defined by portions 1030 and 1032, filled with a non-conductive, card-matching filler in portion 1030 and filled with a non-conductive, transparent filler in portion 1032, may be operable to enable metal frame 1020 to serve as an amplifying antenna or coupling frame, as disclosed in U.S. application Ser. No. 15/928,813, incorporated herein by reference in its entirety. As shown in FIG. 10C, in other embodiments, slit 1056 emanating from the module pocket 1054 in card 1050 may be a separate element that is not integrated into the manufacture of the design defined by the transparent or translucent windows 1052.

It should be understood that creating an extended opening and filling a portion with a transparent or translucent filler and another portion with a non-transparent/non-translucent portion as depicted in FIG. 10B is not limited to embodiments in which the slit as a whole connects the payment module pocket to the edge of the card. For example, it may be desirable for ease of manufacture to create a continuous slit and then fill portions of the slit with different fillers for purely aesthetic reasons, and the different fillers may be of any type. For example, fillers may be transparent, translucent, opaque, conductive, non-conductive, or some combination thereof, with different sections of the same continuous opening (or different discrete openings) having different fillers, each filler having a different aesthetic appearance, such as different colors, different textures, and the like. If desired, the filler may comprise a precious metal, such as gold. In other cases, the windows or portions thereof may be illuminated, such as using an LED, as described herein or in any way known in the art. The "filler" (and the insert material) may completely fill or partially fill all or some of the openings in any of the embodiments disclosed herein.

In one embodiment, depicted in FIG. 18, a light guide layer 1825, comprising a light guide 1810 and a light source 1815, such as a backlit LED, may be sandwiched between metal layers 1820 and 1830. LED 1815 is positioned adjacent an input to the light guide and the windows 1802, 1804, and 1806 are positioned adjacent an output surface of the light guide. Light from the LED 1815 shines into the light guide and is transmitted out through windows 1802, 1804, 1806. Although depicted in one embodiment in FIG. 18, it should be understood that embodiments with a light guide disposed beneath apertures in a metal layer may be provided in any of the other configurations described herein. Windows 1802, 1804, 1806, may have no filler or a transparent or translucent filler, and may be formed via any of the methods or conform to any of the structures described herein.

In some embodiments or designs, rather than creating a continuous slit, such as for the circular shape formed by slits 1022 and 1024, it may be more desirable to create discrete slits with one or more bridges 1026, 1028 of metal between them, for overall structural stability of the card. As depicted in FIG. 10B, the absence of bridges 1026 and 1028 would completely separate the central circular portion from the rest of the metal body. Providing metal separations between adjacent slits is not limited only to embodiments that would prevent separation, however.

As used herein, the term "slit" refers to a gap formed between metal edges, wherein the distance from edge to edge is generally small enough that it is undesirable or impractical to place a separate fill material in the slit prior to a lamination step, and such that the risk of air bubbles forming during lamination is minimal. Lamination conditions can be controlled as desired so that the slit is filled by the overlying and underlying layers without leaving a noticeable indent or partially filled to provide a tactilely distinguishable indent.

Other Card Features

In embodiments in which the card body is metal or ceramic coated metal, and the transaction card comprises a payment module configured for "contactless" interface with a card reader (e.g. in which, in at least one operating mode, the transaction circuit embedded in the card inductively couples to a card reader using RFID technology), positioning the window adjacent the module may enhance RF performance of the card, thereby lengthening the distance at which the card may be read in a contactless mode. Specifically, the absence of metal adjacent the module, specifically near the module antenna, may significantly improve (lengthen) the read distance between the card and the card reader required to couple the card and the card reader relative to a card without the transparent window. Optimal distances may be determined by creating a plurality of otherwise identical cards with different window sizes and locations and testing the difference in read distance of the different designs. Generally, the applicant has found read distance percentage improvements in the range of 12-50%, depending upon the distance in a range of 1-5 cm between the edge of a metal card and a module. Accordingly, an absence of a significant metal area within that 1-4 cm distance due to the hole in the metal body to accommodate the window is expected to provide a measurable level of improvement. It should be understood that because dual interface devices operate in both "contactless" and "contact" modes, reference to a device having "contactless" functionality encompasses both modules having only contactless functionality as well as modules having dual-interface functionality.

In some embodiments, the payment module may be located inside the transparent window, in which case a coupling antenna may be positioned surrounding the module using minimally visible traces inside the transparent window. In other embodiments, the entire metal card body may be used as the coupling antenna or a coupling antenna may be embedded in the body, as is known in the art. The minimally visible traces, including antenna traces, and the module may be obscured with or integrated into graphic content in the nature of a printed design on the window. Positioning of the card reader module within the window is not limited to metal or ceramic-coated metal embodiments, however, and may be present in embodiments featuring an all-ceramic or ceramic-coated non-metal body, also.

As shown in FIG. 3, the electronics 310 and any connecting traces 330 may be disposed on a surface of the window, preferably on the back surface of the window where the electronics can be further covered and protected by the backing layer. As shown in FIGS. 4 and 5, in alternate embodiments, electronics 410, 510 may be embedded in the window 420, 520. In one embodiment, depicted in FIG. 5, embedded electronics may be embedded by injection molding of the electronics 510 within a transparent or translucent polymer that comprises window 520. In such an embodiment, one or more conductive members 532 connected to the electronics, may be disposed in the window oriented in a direction along the thickness of the window (perpendicular to the front and back faces of the window) so as to transmit electrical power and/or signals from an internal portion of the window to a surface 522 of the window (or a layer closer to the surface of the window), where that conductive member 532 connects to conductive traces 530 printed on the window. Exemplary processes for embedding electronics for insertion in a metal card body are described in U.S. Provisional Application Ser. No. 62/555,367, titled "TRANSACTION CARD WITH EMBEDDED ELECTRONIC COMPONENTS AND PROCESS FOR MANUFACTURE," incorporated herein by reference.

In another embodiment, depicted in FIG. 4, the electronics may optionally be disposed on a first layer 422 of transparent or translucent polymer, with a second layer 424 disposed thereon to envelop the electronics (and optionally, one or more conductive lines 430 for connecting to the electronics). A multi-layer window is not limited to only two layers, and may include any number of layers that may provide the aesthetic or functional qualities desired. In a multi-layer embodiment, the conductive lines 430 may be printed on a first layer 422 before another layer (e.g. 424) is disposed.

Non-metal backing layer 120 (e.g. a transparent PVC, but not limited to any particular materials of construction), which is relatively thinner than the relatively thick base, is preferably laminated to the back face of the body and the back face of the window. Although not limited to any particular ranges of thickness, transactions cards are generally standardized in size approximately a thickness of 0.032 inches, and the body is typically in a range of 0.008 to 0.028 inches, preferably in a range of 0.010 to 0.020 inches, more preferably, 0.012 to 0.018 inches, with the backing layer optionally having a thickness to make up the difference between the overall thickness and the body, minus the thickness of any adhesive layers or other coatings.

One or more features may be printed on the body, which may comprise a printable metal such as printable stainless steel (e.g. stainless steel having a coating (not shown) at least on front face 104 that improves acceptance of printing inks on the steel surface). The coating may comprise, for example, a polyester based coating receptive to UV curable screen and inkjet inks or solvent or oxidation printing. In other embodiments, dye or sublimation printing may be used. For embodiments with a ceramic body, or a ceramic-coated body, the ceramic may be similarly coated, roughened (such as chemically, mechanically, or with a laser), to receive a printed layer. Printed embodiments are not limited to any particular printing technology or technique.

As depicted in FIG. 1A, the front face of the card may have a decorative pattern. The decorative pattern may be a printed pattern (or may be an engraved or etched pattern, as further explained below), or the front face may be printed with a solid color (e.g. black as shown in FIG. 1A), or may comprise some combination of solid color, printed graphics or patterns, printed information, and engraved or etched patterns, graphics, or information. Printed information may include the name of the card issuer (e.g. Citi, Bank of America, etc.—represented by the text "BANK" in FIG. 1A), the type and/or name of the card (e.g. VISA® SAPPHIRE, AMERICAN EXPRESS®, etc.—represented by the text "CARD NAME" in FIG. 1A), the name of the cardholder, a unique serial number of the card, expiration date, and the like. Certain printed information (e.g. graphics, name of the card) may be printed in a first printing step to create a card "blank" ready for personalization, and other printed information (cardholder, serial number, expiration date) may be printed in a second personalization printing step. The first and second printing steps are typically performed geographically and temporally distant from one another and by different printers. The printing may extend to printing on the window insert, including the printing across the interface between the periphery of the window and the periphery of the hole. The printing may be performed using UV curable inks, but the invention is not limited to any particular type of ink.

The front face of the body may further have decorative grooves disposed therein, such as by etching, machining, lasering, or the like. Thus, in one embodiment, the pattern shown in FIG. 1A may be composed of a black solid printed base, with grooves disposed in a pattern (depicted as a fish scale pattern in FIG. 1A, but not limited to any particular type of pattern, and not limited to a repeating or regular pattern, to a single pattern, or to a pattern having any specific amount of coverage—i.e. the pattern(s) may stretch across the entire card face or may be limited to one or more distinct areas of the card). The grooves may be filled, such as with a different color ink than the face of the card, or the grooves may expose the color of the metal or ceramic or body underlying the ceramic beneath the print layer. The grooves may penetrate only the printed layer, or may penetrate the body. The grooves may be cut into the window and extend across the interface between the edge of the body and the window. Similarly, the printed layer on the card may extend across this interface.

Thus, as depicted in FIG. 1A, the interface 132 between the respective peripheries of the window insert 112 and the hole 108 may be located radially within a printed feature, such as the printed solid black circle 130 surrounding the ship graphic 118, such that the printing that extends over the interface helps to visually de-accentuate the interface. In another embodiment, the interface may be located slightly radially outward of circle 130, such that the design imparted by the grooves also extends across the interface, further de-accentuating the interface. In embodiments in which it is desired for the window to be substantially devoid of printing, the printed content may include only the decorative peripheral outline that overlaps the interface (i.e. is disposed on both the window and the card body on either side of the interface), such that the majority of the window located radially inward of the interface or radially inward of the printed peripheral outline is devoid of printing.

In some embodiments, the front face may further comprise an optional hard coat layer 140, whereas other embodiments may have no covering over the printed/engraved layer or over the uncoated metal or ceramic surface on the front face of the card. The transaction card may further comprise a magnetic stripe 150, a signature panel 152, a hologram 154, a machine readable code 156 (depicted as a bar code, but may include any type of machine readable code, including but not limited to a QR code), or a combination thereof, preferably disposed over the backing layer 120 over the back face 106 of the body 102. Most embodiments also include an embedded integrated circuit (not shown) connected to contacts 160 configured to be read by a card reader, an embedded RFID antenna (not shown), or a combination thereof (for a dual interface (DI) card), to permit use with contact-based and/or contactless card readers. Although hole 108 may be purely aesthetic in nature, the hole may be strategically positioned on the card in a location that enhances RF performance of a dual interface card.

An exemplary process for manufacturing a transaction card as described herein may comprise first providing the body 102 having thickness (T), creating hole 108 in the body having a periphery and extending from the front face 104 to the back face 106 of the body. The non-metal backing layer 120 is positioned adjacent the back face of the body, preferably tacked in place by an adhesive disposed on the side of the backing layer facing the body, and the non-magnifying transparent insert 112 is inserted in the hole 108 in contact with the adhesive of the backing layer 120, and the assembly is then laminated together. The insert may be created by any manner known in the art, such as by cutting or punching a plurality of inserts having the desired periphery from a sheet of the insert materials, or by extruding a rod having the periphery of the insert and cutting chips from the rod having thickness (T).

Hole 108 may be created by any method known in the art, such as in a metal body by cutting (e.g. mechanical or laser), punching, or etching, such as using computer controlled (e.g. computerized numerical control—CNC) machines. In an embodiment in which the body comprises printable stainless steel (or any other coated metal in which the integrity of the coating is important), a resist may be applied over the coated surfaces or portions thereof desired to remain coated during any acid etching steps (such as if an etching step is used for creating the hole). For example, the resist is applied to the entire surface of the metal except where hole 108 and any other pockets or surface patterns are to be formed. After etching, the remaining resist is removed the body is ready for further processing.

In an exemplary ceramic body embodiment in which the body comprises a solid ceramic, the hole is preferably formed in the green state of the ceramic, and then the ceramic is fired. The size of the pre-firing hole diameter is selected to produce the desired post-filing hole diameter given the characteristics of the ceramic material and expected changes in hole diameter, if any, during the firing process. Although alternative process may involve producing a ceramic blank without a hole, and then mechanically milling, lasering, or freeze/fracturing the hole after firing, such methods are generally less efficient and thus not preferred. In an exemplary embodiment in which the body comprises a metal core with a ceramic coating, the metal body may be created as described above, with the desired ceramic coating then applied over the metal. For example, a spray coating of a ceramic combined with a binder may be applied, or a ceramic may be disposed, such as via injection molding, around the metal, and then fired. In preferred embodiments, the sprayed ceramic coating may be applied only to the front face of the metal core. Ceramic-coated bodies with a non-metal core may be similarly processed.

The laminated assembly may than undergo a printing step, to print the desired matter on the front face of the body. In an exemplary process, the printing step comprises printing the printed matter with an inkjet printer using UV curable ink and then exposing the printing to UV radiation suitable to cure the ink. The front face of the body may be etched or engraved with grooves before or after printing. In a process where the grooves are filled, such as with a different color ink or a metal, a groove-filling step may be performed after grooves are created, such as by a wiping step that wipes filler material across the face so that the filler (ink, metal, resin, etc.) only deposits in the indents created by the grooves.

Although described above in a preferred sequence of steps, it should be understood that the above steps are not limited to performance in any particular sequence. For example, in some processes, the steps of cutting the hole, tacking the backing layer in place, and inserting the window may be performed after steps relating to printing, creating grooves, etc. on the front face of the card. In other processes, the grooves may be created before printing.

As depicted in FIG. 2, each finished transaction card 100 defines a first bounded area (corresponding to the length and width of the card, minus the area of any rounded edges). In a metal card embodiment, the card may be manufactured from a sheet 200 having a second area that is somewhat greater than a multiple of the first area (e.g. slightly greater than 8× as depicted in FIG. 2). In such a manufacturing process, the process further comprises cutting the metal sheet into a plurality of transaction cards corresponding to the multiple. As shown in FIG. 2, the ratio of the second area to the first area is typically not an integer (e.g. some value between 8 and 9 as depicted in FIG. 2), whereas the multiple corresponding to the number of cards cut from the sheet may represent the closest integer corresponding to the second area, rounded down. The cutting steps for cutting the hole and for cutting the individual cards from the sheet may be performed by a laser. Any grooves may be machined, etched, or laser formed. Although depicted as nearly finished cards in FIG. 2, it should be understood that in some embodiments, metal or other material cores may be similarly cut from a larger sheet prior to application of the ceramic coating.

The integrated circuit, and connected contacts and/or antenna, may be embedded in the metal card body by any method known in the art, such as is described in U.S. Pat. No. 9,390,366, incorporated herein by reference. In embodiments where the optional hard coat layer is applied to the front face of the card, the hard coat may be applied as a coating, or as a discrete layer, such as is described in U.S. Published Application No. 20140224881, also incorporated herein by reference for its teaching of applying a hard coat layer to a metal card. Although described herein with reference to only certain layers, it should be understood that some embodiments may comprise additional layers between, over, or under the described layers, including laminates, adhesive layers, printed content, or coatings (including but not limited to a ceramic coating), without limitation.

Referring now to FIGS. 19A-19C, there is illustrated another transaction card embodiment 1900. The transaction card includes a metal layer 1910 having front and back surfaces and at least two openings 1920 and 1930, each opening extending through one or both of the front and back surfaces of the metal layer. In the embodiment depicted in FIG. 19B, openings 1920 and 1930 both extend through both the top surface and the bottom surface of the metal layer, with opening 1920 having a relatively greater periphery at the top surface than at the bottom surface. A transponder module 1925 (preferably contactless or dual-interface) is disposed in opening 1920, and may rest on the step 1921 between relatively wider and relatively narrower portions of opening 1920. Transponder module 1925 may be disposed on or in a plug of non-metal material, as is known in the art.

LED module 1935 is disposed in opening 1930. LED module 1935 has a planar illuminated area 1937 visible from a finished surface (e.g. the front surface) of the transaction card. As depicted in FIG. 19C, in one embodiment LED module 1935 comprises LEDs 1932 (depicted as side-fire LEDs) configured to emit light, and a light guide 1933 for distributing the light emitted by the one or more LEDs across the illuminated area 1937. Some portion of the LED module 1934 may thus be unilluminated. The unilluminated portion may thus be hidden behind opaque areas of an overlying layer or printing on top of the overlying layer, and the features of the overlying layer or printing thereon may be optimized to print across the interface between the periphery of the opening 1930 and the illuminated portion 1937 of the LED module. As depicted in FIG. 19B, the LED module is secured in a window 1930 that fully penetrates the metal layer from top surface to bottom surface such that a bottom surface of the LED module is flush with the bottom surface of the metal layer and a top surface of the LED module is flush with the top surface of the metal layer. In other embodiments, the LED module may be secured in a blind pocket that does not fully penetrate the metal layer from top surface to the bottom surface. Typically, the LED module, and in particular the illuminated area 1950, is non-transparent or non-translucent, such that whatever is disposed behind the LED module (e.g. backing layer 1940 or the bottom of a blind pocket) is not visible from the front of the card.

Any number of LEDs 1932 may be provided. In some embodiments, the illumination circuit for the LEDs may include at least two LEDs, with more or different LEDs being illuminated as an indicator of field strength (e.g. greater field strength translates to greater harvested energy and thus greater power available to the illumination circuit, which may illuminate in various power-dependent ways). In some embodiments, all of the LEDs (e.g. 1932a, 1932b) may be the same color, with the circuit configured to illuminate only a first LED at a minimal field strength, and both the first and a second LED at a relatively greater field strength. In circuits with more than two such LEDs (not shown), all of a first, second and third LED may illuminate at relatively greatest field strength. Thus, the energy range for which the first LED illuminates overlaps with the entire energy range of the second LED. In configurations with three LEDs, the energy range over which the first LED illuminates overlaps with the entire energy ranges for which each of the second and third LEDs respectively illuminate, and the energy range over which the second LED illuminates overlaps with the entire energy range over which the third LED illuminates.

In other embodiments, LEDs of multiple colors may be provided, with circuitry configured to illuminate a first LED 1932a (e.g. red) corresponding to a relatively weaker field strength and a second LED 1932b (e.g. green) corresponding to a relatively stronger field strength. The ranges in which the two different LEDs illuminate may have overlapping ranges. For example, a two-LED set may be configured to illuminate red LED 1932a within a first range of power (e.g. 1-66%) and green LED 1932b within a second range of power (e.g. 33%-100%), with both LEDs illuminated to produce yellow light within the overlapping range (e.g. 33-66%).

Intensity of illumination may also be varied based upon strength of field, such that a single LED or multiple LEDs having the same wavelength may provide variation in brightness as a field strength indicator. For example, in embodiments in which both LEDs 1932a and 1932b emit the same wavelength, the intensity of illumination of LED 1932a may range from relatively weaker intensity at 1% field strength to relatively stronger intensity at 50%-100% field strength, and the intensity of illumination of LED 1932b may range from relatively weaker intensity at 51% to relatively stronger intensity at 100% field strength. Likewise, multiple LEDs having different wavelengths may be illuminated in various combinations of one or more LEDs to create a spectrum of colors based upon strength of field. For example, from relatively weakest to relatively strongest field strength, the LEDs may illuminate in a spectrum (e.g. red=red LED only, optionally over a range of relatively dim to relatively bright intensity; orange=more red LED intensity than green LED intensity; yellow=relatively equal red and green LED intensity; yellow-green=more green LED intensity than red LED intensity; green=green LED only, optionally over a range of relatively dim to relatively bright intensity). The number and/or color of LEDs is not limited to any particular configuration. Those of skill in the field of electronics are familiar with basic circuitry required to illuminate different LEDs in response to power supplied to the circuit, and therefore specific configurations are not detailed herein. Ranges and variations over those ranges are for illustration only, and not intended to limit the invention in any way.

As is understood to those of skill in the art, in use, a contactless or dual-interface transponder module is a component in a transaction circuit configured to communicate with a card reader (not shown) configured to emit radio frequency (RF) waves having energy. As is well known in the art, the transaction circuit includes transponder module 1925 configured to receive (with receiver connected to antenna 1986) an incoming RF signal 1984 emitted by a transmitting antenna 1982 of a transmitter in card reader 1980, and to respond with an outgoing RF signal 1985 emitted by a transmitter with transmitting antenna 1988, which is received by a receiver with receiving antenna 1983 of the card reader. Receiver/receiving antenna 1982 and transmitter/transmitting antenna 1983 may comprise a single transceiver/transceiver antenna configured for 2-way communications. The transponder is typically powered by harvesting energy from the RF waves 1984 emitted by the card reader 1980. The transponder typically has its own power generation circuit, similar to that described below with respect to the power source for the LED module. In other embodiments, power may be provided by an active-driven RF transceiver with a power source (e.g. a battery) mounted in the device and/or the LED may also have (or share with the transponder) a power source mounted in the device.

LED module 1933 comprises one or more components in an illumination circuit also powered by energy harvested from RF waves 1984. The illumination circuit comprises power source 1990, comprising an energy harvesting circuit (configured to produce AC or DC power), LEDs 1932, and one or more surface mount technology (SMT) components 1938. The illumination circuit, such as in one or more of the SMT components, may include a charge pump (also called a voltage pump or voltage generator), which circuitry is generally known to those skilled in the art, for increasing the operating voltage of the illumination circuit above the voltage of the RF waves. Any type of circuitry for stepping up or stepping down the voltage may be provided. In some embodiments, the illumination circuit and the transaction circuit are isolated from one another such that the illumination circuit is configured to illuminate independent of status of a transaction performed by the transaction circuit. As used herein the term "transaction circuit" refers to any circuit for processing a transaction. In payment devices (credit cards, debit cards), the transaction circuit may comprise a typical payment circuit configured to exchange payment information between the card and the card reader such that the payer's account is ultimately debited, and the payee's account is ultimately credited. Suitable transactions are not limited to payment transactions, however, and may include any exchange of information between the card and the card reader that ultimately results in recording information. For example, a loyalty card for a casino may track the amount a user gambles, wins or loses, which recordation is a "transaction," without the loyalty card actually administering payments associated with the bets, wins, or losses. Thus, to the extent the term "transaction circuit" is used herein, it should be understood to refer to any exchange of information relating to any type of transaction, including but not limited to a payment circuit. In other embodiments, the illumination circuit and the transaction circuit comprise components in a unified circuit in which the illumination circuit is configured to illuminate in a manner indicative of a status of a transaction performed by the transaction circuit. In still other embodiments, both the transaction circuit and the illumination circuit may share power from a single energy harvesting source, without the transaction circuit and the illumination circuit being otherwise connected to one another (i.e. the illumination is not dependent upon status of the transaction).

An exemplary simple energy harvesting circuit 1900 is schematically depicted in the magnified region of FIG. 19A, and as is well known in the art, typically comprises a receiving antenna 1991 for receiving RF waves from a source (in this case waves 1984 from card reader 1980), attached to a rectifier/voltage multiplier 1994, a capacitor (or battery) 1995 in parallel to one or more resistors 1992 disposed between the antenna 1991 and ground 1993, and produces a direct current (DC) voltage between poles 1996 and 1997. This DC voltage supplies power to the connected circuit(s). Additional components, such as an impedance matching network (IMN) (not shown) between the antenna and the rectifier and/or any other logic or other circuitry components known in the art for use in power harvesting applications may also be included in the circuit 1900.

As depicted in FIGS. 19A and 19B, metal layer 1910 has a first discontinuity 1902 extending from the periphery of the card to opening 1920 and a second discontinuity 1904 extending from the periphery of the card to opening 1930. Card 1900 further comprises a back non-metal layer 1940 disposed on the back surface of the metal layer 1910, and a front non-metal layer 1950 disposed on the front surface of the metal layer. A pattern 1960, such as a word, logo, or graphic printed or otherwise disposed on or in the front non-metal layer 1950, overlies the illuminated area 1937 of the LED module positioned to be backlit by the LED module. Although shown as a positive raised pattern 1960 in FIG. 19B, such as from printing ink disposed on layer 1950, the pattern may comprise opaque portions of non-metal layer 1950 itself, of a negative pattern formed by holes in an otherwise opaque non-metal layer 1950. The pattern may be multicolor. Metal layer 1910 may act as a booster antenna connected to one of both of antennas 1986, 1991 for boosting the signal received from the card reader, or may be isolated from one or both of the payment and/or illumination circuits.

The location of the opening 1930 and LED module in close proximity to transponder module 1925 may provide improved RF performance of the card relative to a card with an absence of the window. Likewise, the first and second discontinuities, 1902, 1904 may also improve RF performance relative to a card with an absence of the discontinuities.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A transaction card having opposite finished surfaces and a periphery, the transaction card comprising:
 a metal layer having opposite surfaces and at least two openings, each opening extending through one or both of the opposite finished surfaces, and wherein the metal layer has at least one discontinuity extending from the periphery of the card to at least one of the at least two openings in the metal layer and at least one discontinuity connected to and extending between the at least two openings;
 a transponder module disposed in one of the at least two openings in the metal layer, the transponder module comprising a component in a transaction circuit configured to communicate wirelessly with a card reader that is configured to emit radio frequency (RF) waves having energy, the transaction circuit configured to receive an incoming RF signal from the card reader, to respond with an outgoing RF signal, and to power the transaction circuit by harvesting energy from the RF waves;
 a light emitting diode (LED) module disposed in another of the at least two openings in the metal layer and having a planar illuminated area visible from a finished surface of the transaction card, the LED module comprising: one or more LEDs configured to emit light, the LED module comprising a component in an illumination circuit configured to harvest energy from the RF waves for powering the one or more LEDs; and
 at least one non-metal layer disposed on each of the opposite finished surfaces of the metal layer, wherein the at least one non-metal layer comprises a printed pattern, the printed pattern overlying the illuminated area of the LED module and being visible over an unilluminated area of the LED module.

2. The transaction card of claim 1, wherein the illumination circuit is configured to illuminate independent of status of a payment transaction performed by the transaction circuit.

3. The transaction card of claim 1, wherein the illumination circuit and the transaction circuit comprise components in a unified circuit in which the illumination circuit is configured to illuminate in a manner indicative of a status of a payment transaction performed by the transaction circuit.

4. The transaction card of claim 1, wherein the at least one discontinuity extends from the periphery of the card to the opening containing the transponder module and another of the at least one discontinuity extends from the periphery of the card to the opening containing the LED module.

5. The transaction card of claim 1, wherein the illumination circuit is configured to have a variable illumination characteristic dependent upon a characteristic of the harvested energy.

6. The transaction card of claim 5, wherein the illumination circuit comprises at least one LED having a variable intensity, wherein the LED is configured to illuminate with a first, relatively lower intensity in response to harvested energy in a first, relatively lower range and to illuminate with a second, relatively higher intensity in response to harvested energy in a second, relatively higher range.

7. The transaction card of claim 5, wherein the illumination circuit has at least two LEDs and is configured to illuminate one of the at least two LEDs in response to harvested energy in a first, relatively lower range and to illuminate another of the at least two LEDs in response to harvested energy in a second, relatively higher range.

8. The transaction card of claim 7, wherein the at least two LEDs are each configured to emit a same wavelength of light.

9. The transaction card of claim 7, wherein at least one of the at least two LEDs is configured to emit a different wavelength of light than the other of the at least two LEDs.

10. The transaction card of claim 9, wherein one of the at least two LEDs is configured to generate a wavelength in the green visible spectrum of light and another of the at least two LEDs is configured to generate a wavelength in the red visible spectrum of light.

11. The transaction card of claim 1, wherein the LED module further comprises a light guide for distributing the light emitted by the one or more LEDs across the illuminated area.

12. The transaction card of claim 1, wherein the printed pattern has a first section overlying the illuminated area of the LED module and a second section disposed across an interface between a periphery of at least one of the openings in the metal layer and the illuminated area of the LED module, the second section being visible over an unilluminated area of the LED module.

13. A transaction card having opposite finished surfaces and a periphery, the transaction card comprising:
 a metal layer having opposite surfaces and at least two openings, each opening extending through one or both of the opposite finished surfaces;
 a transponder module disposed in one of the at least two openings in the metal layer, the transponder module comprising a component in a transaction circuit configured to communicate wirelessly with a card reader that is configured to emit radio frequency (RF) waves having energy, the transaction circuit configured to receive an incoming RF signal from the card reader, to respond with an outgoing RF signal, and to power the transaction circuit by harvesting energy from the RF waves;
 a light emitting diode (LED) module disposed in another of the at least two openings in the metal layer and having a planar illuminated area visible from a finished surface of the transaction card, the LED module comprising: one or more LEDs configured to emit light, the LED module comprising a component in an illumination circuit configured to harvest energy from the RF waves for powering the one or more LEDs;
 at least one non-metal layer disposed on each of the opposite finished surfaces of the metal layer, wherein the at least one non-metal layer comprises a printed pattern, the printed pattern overlying the illuminated area of the LED module and being visible over an unilluminated area of the LED module;
 wherein the illumination circuit has at least two LEDs and is configured to illuminate one of the at least two LEDs in response to harvested energy in a first, relatively lower range and to illuminate another of the at least two LEDs in response to harvested energy in a second, relatively higher range;
 wherein the illumination circuit is configured to have a variable illumination characteristic dependent upon a characteristic of the harvested energy;
 wherein the illumination circuit has at least two LEDs and is configured to illuminate one of the at least two LEDs in response to harvested energy in a first, relatively lower range and to illuminate another of the at least two LEDs in response to harvested energy in a second, relatively higher range; and
 wherein the first range and the second range are overlapping, such that the illumination circuit is configured to illuminate both of the at least two LEDs when the harvested energy is in the overlapping range.

14. A transaction card having opposite finished surfaces and a periphery, the transaction card comprising:
 a metal layer having opposite surfaces and at least two openings, each opening extending through one or both of the opposite finished surfaces;
 a transponder module disposed in one of the at least two openings in the metal layer, the transponder module comprising a component in a transaction circuit configured to communicate wirelessly with a card reader that is configured to emit radio frequency (RF) waves having energy, the transaction circuit configured to receive an incoming RF signal from the card reader, to respond with an outgoing RF signal, and to power the transaction circuit by harvesting energy from the RF waves;
 a light emitting diode (LED) module disposed in another of the at least two openings in the metal layer and having a planar illuminated area visible from a finished surface of the transaction card, the LED module comprising: one or more LEDs configured to emit light, the LED module comprising a component in an illumination circuit configured to harvest energy from the RF waves for powering the one or more LEDs;
 at least one non-metal layer disposed on each of the opposite finished surfaces of the metal layer, wherein the at least one non-metal layer comprises a printed pattern, the printed pattern overlying the illuminated area of the LED module and being visible over an unilluminated area of the LED module;
 wherein the illumination circuit is configured to have a variable illumination characteristic dependent upon a characteristic of the harvested energy;
 wherein at least one of the at least two LEDs is configured to emit a different wavelength of light than the other of the at least two LEDs;
 wherein one of the at least two LEDs is configured to generate a wavelength in the green visible spectrum of light and another of the at least two LEDs is configured to generate a wavelength in the red visible spectrum of light; and
 wherein the illumination circuit is configured to illuminate the red LED in response to harvested energy in a first, relatively lower range, to illuminate the green LED in response to harvested energy in a second, relatively higher range, and to illuminate both the red LED and the green LED when the harvested energy in response to harvested energy in a third, intermediate range between the first, relatively lower range and the second, relatively higher range.

15. The transaction card of claim 14, wherein one or both of the red LED and the green LED are configured to illuminate with variable intensity.

16. A transaction card having opposite finished surfaces and a periphery, the transaction card comprising:
- a metal layer having opposite surfaces and at least two openings, each opening extending through one or both of the opposite finished surfaces;
- a transponder module disposed in one of the at least two openings in the metal layer, the transponder module comprising a component in a transaction circuit configured to communicate wirelessly with a card reader that is configured to emit radio frequency (RF) waves having energy, the transaction circuit configured to receive an incoming RF signal from the card reader, to respond with an outgoing RF signal, and to power the transaction circuit by harvesting energy from the RF waves;
- a light emitting diode (LED) module disposed in another of the at least two openings in the metal layer and having a planar illuminated area visible from a finished surface of the transaction card, the LED module comprising: one or more LEDs configured to emit light, the LED module comprising a component in an illumination circuit configured to harvest energy from the RF waves for powering the one or more LEDs;
- at least one non-metal layer disposed on each of the opposite finished surfaces of the metal layer, wherein the at least one non-metal layer comprises a printed pattern, the printed pattern overlying the illuminated area of the LED module and being visible over an unilluminated area of the LED module; and wherein the LED module is located in the metal layer in a position that improves RF performance of the transponder module relative to a card without the LED module.

17. A transaction card having opposite finished surfaces and a periphery, the transaction card comprising:
- a metal layer having opposite surfaces and at least two openings, each opening extending through one or both of the opposite finished surfaces;
- a transponder module disposed in one of the at least two openings in the metal layer, the transponder module comprising a component in a transaction circuit configured to communicate wirelessly with a card reader that is configured to emit radio frequency (RF) waves having energy, the transaction circuit configured to receive an incoming RF signal from the card reader, to respond with an outgoing RF signal, and to power the transaction circuit by harvesting energy from the RF waves;
- a light emitting diode (LED) module disposed in another of the at least two openings in the metal layer and having a planar illuminated area visible from a finished surface of the transaction card, the LED module comprising: one or more LEDs configured to emit light, the LED module comprising a component in an illumination circuit configured to harvest energy from the RF waves for powering the one or more LEDs;
- at least one non-metal layer disposed on each of the opposite finished surfaces of the metal layer, wherein the at least one non-metal layer comprises a printed pattern, the printed pattern overlying the illuminated area of the LED module and being visible over an unilluminated area of the LED module;
- wherein the illumination circuit includes a voltage increasing or voltage decreasing component and the illumination circuit includes a charge pump.

* * * * *